United States Patent
Sanders et al.

(10) Patent No.: US 7,535,800 B2
(45) Date of Patent: May 19, 2009

(54) SEISMIC IMAGING AND TOMOGRAPHY USING SEABED ENERGY SOURCES

(75) Inventors: Michael Julian Sanders, Kuala Lumpur (MY); John Richard Tulett, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/127,014

(22) Filed: May 11, 2005

(65) Prior Publication Data

US 2006/0256651 A1    Nov. 16, 2006

(51) Int. Cl.
G01V 1/38    (2006.01)

(52) U.S. Cl. ............................ 367/146; 367/15; 367/23; 367/57

(58) Field of Classification Search ................ 367/15, 367/23, 141–148, 57; 181/110, 118, 120
See application file for complete search history.

(56) References Cited

U.S. PATENT DOCUMENTS

| | | | |
|---|---|---|---|
| 3,770,080 A | | 11/1973 | Laurent et al. |
| 3,833,087 A | | 9/1974 | Cholet |
| 3,997,022 A | | 12/1976 | Cholet |
| 4,253,539 A | | 3/1981 | Magneville |
| 4,300,654 A | | 11/1981 | Raymond et al. |
| 4,402,382 A | * | 9/1983 | Mollere ..................... 367/144 |
| 4,794,573 A | | 12/1988 | Bell et al. |
| 4,805,726 A | | 2/1989 | Taylor et al. |
| 4,956,822 A | * | 9/1990 | Barber et al. ................ 367/23 |
| 5,555,220 A | * | 9/1996 | Minto ......................... 367/86 |
| 5,585,556 A | | 12/1996 | Petersen et al. |
| 6,175,809 B1 | * | 1/2001 | Naville ....................... 702/14 |
| 6,308,137 B1 | | 10/2001 | Underhill |
| 6,470,997 B1 | * | 10/2002 | McCall et al. ............... 367/144 |
| 6,917,564 B2 | * | 7/2005 | Leaney ........................ 367/73 |
| 2005/0207277 A1 | * | 9/2005 | Gordy et al. ................. 367/14 |

FOREIGN PATENT DOCUMENTS

EP    222666 B1    9/1991

OTHER PUBLICATIONS

Harben, et al. "Use of Imploding Spheres: an alternative to explosives as acoustic sources at mid-latitude SOFAR channel depths." US Dept. of Energy, May 12, 2000.*

(Continued)

*Primary Examiner*—Jack W. Keith
*Assistant Examiner*—Scott A Hughes
(74) *Attorney, Agent, or Firm*—Matthias Abrell; Jaime Castano; Dale Gaudier

(57) ABSTRACT

In-sea seismic energy sources, deployed at or near the seabed, generate seismic waves in earth formations beneath the seabed when activated by a triggering mechanism at a precise time synchronized with seismic data acquisition by sensors deployed at predetermined locations around a well drilled for oil and gas exploration. Seismic waves generated at the seabed travel with more direct and predictable ray-paths through the earth to the sensors. Acquired data, including a precise time and location of the seismic events, are used to provide enhanced borehole and sea-bottom seismic surveys.

18 Claims, 18 Drawing Sheets
(3 of 18 Drawing Sheet(s) Filed in Color)

OTHER PUBLICATIONS

R. Herber et al., "An improsive seismoacoustic source for seismic experiments on the ocean floor", Marine Geophysical Researches, 1998, pp. 239-27, vol. 20, No. 3, Kluwer Academic Publishers, Netherlands.

Leroy M. Dorman et al., "A reusable improsive seismic source for midwater or seafloor use", Geophysics, Sep.-Oct. 2006, pp. Q19-Q24, 6 Figs., vol. 71, No. 5, Society of Exploration Geophysicists.

Harben, P.E., et al., "Implosion Source Devlopment And Diego Garcia Reflections", 23rd Seismic Research Review: Worldwide Monitoring of Nuclear Explosions, Oct. 2-5, 2001, pp. 23-31.

Harben, P.E., et al., "Calibration of Hydrophone Stations: Lessons Learned from The Ascension Island Experiment", W-7405-ENG-48.

Puill J.J. et al., "Hydroacoustic Calibration with Imploding Glass Spheres", 22nd Annual DoD/DOE Seismic Research Proc., 2000, vol. III, pp. 65-74.

Orr, M. et al., "Acoustic Signatures from Deep Water Implosions of Spherical Cavities", J. Acoust. Soc., 1976, V59. pp. 1155-1159.

* cited by examiner

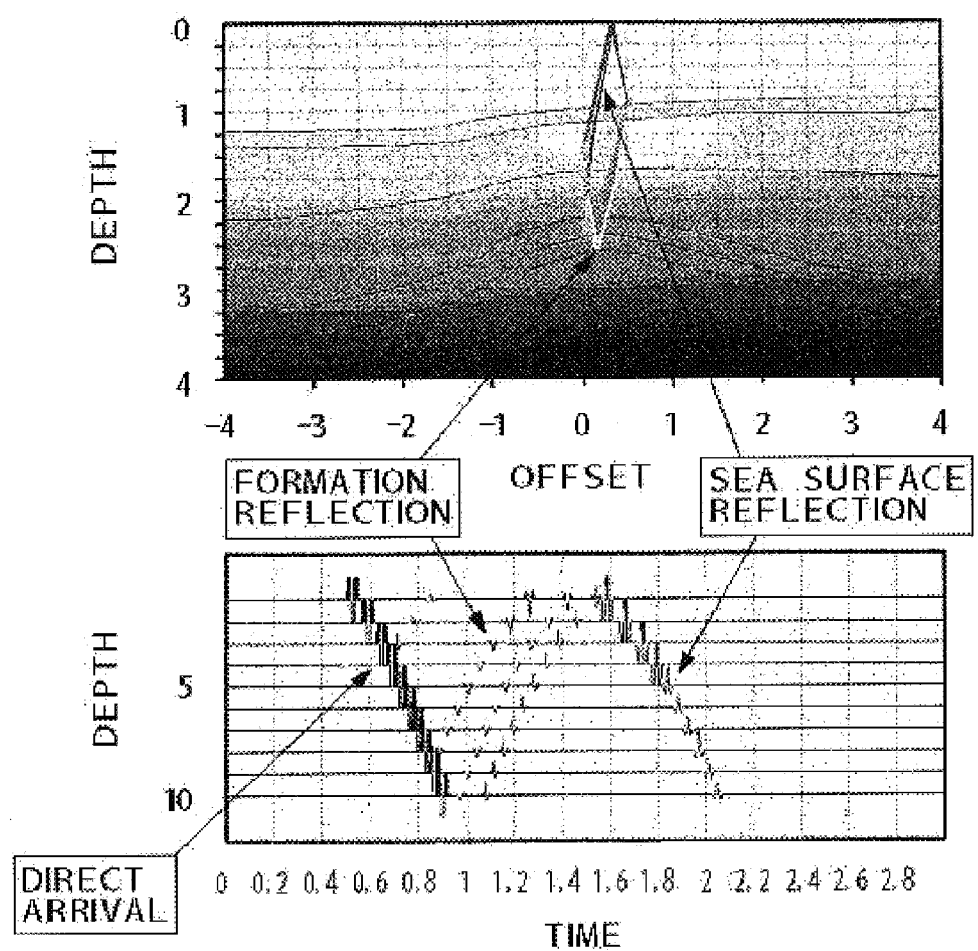

SEISMIC IMAGING AND TOMOGRAPHY USING SEABED ENERGY SOURCES

FIELD OF THE INVENTION

The present invention relates to seismic data acquisition and imaging by generating seismic waves for detection with sensors deployed, for example, in and/or around a well that is drilled for oil and gas exploration and production. More particularly, the present invention is directed to methods and system having in-sea energy sources for generating seismic waves in the earth beneath the seabed to obtain accurate velocity and enhanced seismic reflection data for analyzing subsurface geologic formations.

BACKGROUND OF THE INVENTION

Analysis of subsurface formations has led to more efficient oil and gas recovery from hydrocarbon reservoirs. In recent years, exploration and development of hydrocarbon reserves has been occurring at increasingly deeper depths of water. As the water depths increase and the wells that are drilled lengthen, recovery of formation fluids from subsurface formations becomes increasingly difficult and complex. In consequence, vertical seismic profile surveys are a useful and necessary technique to characterize subsurface formations so that the hydrocarbon fluids in the formations can be efficiently recovered.

A vertical seismic profile (VSP) is a class of borehole seismic measurements used for correlation between surface seismic receivers and wireline logging data. VSPs can be used to tie surface seismic data to well data, providing a useful tie to measured depths. Typically, VSPs yield higher resolution data than surface seismic profiles provide. VSPs enable converting seismic data to zero-phase data, as well as enable distinguishing primary reflections from multiples. In addition, a VSP is often used for analysis of portions of a formation ahead of the drill bit.

Narrowly defined, VSP refers to measurements made in a vertical wellbore using acoustic receivers inside the wellbore and a seismic source at the surface near the well. In a more general context as used herein, however, VSPs vary in well configuration, the number and location of sources and acoustic receivers, and how they are deployed. Nevertheless, VSP does connote the deployment of at least some receivers in the wellbore. Most conventional VSPs use a surface seismic source, which is commonly a vibrator on land, or an air-gun in marine environments. There are various VSP configurations including zero-offset VSP, offset VSP, walkaway VSP, vertical incidence VSP, salt-proximity VSP, multi-offset VSP, and drill-noise or seismic-while-drilling VSP.

Check-shot surveys are similar to VSP in that acoustic receivers are placed in the borehole and a surface source is used to generate an acoustic signal. However, a VSP is more detailed than a check-shot survey. The VSP receivers are typically more closely spaced than those in a check-shot survey; check-shot surveys may include measurement intervals hundreds of meters apart. Further, a VSP uses the reflected energy contained in the recorded trace at each receiver position as well as the first direct path from source to receiver, while the check-shot survey uses only the direct path travel time.

Although VSPs are a valuable information tool for analyzing subsurface formations, acquisition of seismic survey data by way of seismic waves that are generated by a surface source poses problems. In particular, use of a surface source, such as an air-gun, in marine environments generates seismic energy waves that must propagate a distance through water to reach the seabed and the subsurface formations below the seabed for purposes of seismic survey data. In this, the distance between a surface seismic energy source and the seabed introduces uncertainty in the acquired seismic data. Furthermore, surface seismic sources for generating seismic waves in marine environments, such as air-guns, are affected by sea swells in rough weather. As an additional shortcoming, conventional surface and subsea seismic sources require a flow of high-pressure air and/or hydraulic oil for their operation. Typically, such conventional seismic sources require special procedures for their safe handling and operation.

Among devices that are known for generating seismic waves below the sea surface are powered seabed sources, such as shear wave air-guns. Such devices have been used in borehole seismic surveys. However, powered seabed sources require the delivery of large amounts of energy from the sea surface down to the seabed floor, which makes the operation and handling of such devices complicated and expensive. In this, it is difficult to safely deploy and retrieve a powered source from the seabed after acquiring seismic data.

Boro, C. et al., *Sphere Implosion Initiation Device*, Record of Invention IL-10551, University of California, LLNL Patent Group (1999), use imploding spheres in calibration of hydro-acoustic monitoring devices used for the Comprehensive Nuclear Test Ban Treaty. Orr, M. et al., *Acoustic Signatures From Deep Water Implosions of Spherical Cavities*, J. Acoust. Soc., V 59, pp. 1155-1159 (1976), and Pulli J. J. et al., *Hydroacoustic Calibration with Imploding Glass Spheres*, 22nd Annual DoD/DOE Seismic Research Proc., Vol. III, pp. 65-74 (2000), also discuss imploding spheres.

SUMMARY OF THE INVENTION

In consequence of the background discussed above, and other factors that are known in the field of seismic surveys, applicants recognized a need for single-use, disposable energy sources for generating undersea seismic waves.

Applicants discovered surprising advantages and results in using a seismic source at or near a seabed for generating seismic waves in the earth beneath the seabed.

Applicants recognized that it would be highly advantageous to have an in-sea seismic device that is easily deployable and has a triggering mechanism for initiating the device at a precise predetermined time and location proximate to the seabed.

Applicants further recognized that a single-use, in-sea seismic source for marine seismic applications would solve problems relating to conventional surface and underwater seismic sources.

In one aspect of the invention, in-sea seismic sources, which generate seismic waves in the earth beneath the seabed, are deployed at or proximate to the seabed floor.

Applicants discovered that seismic energy released at the seabed travels more predictably downward through the earth formations to provide accurate and enhanced seismic data by way of sensors placed, for example, at strategic intervals inside a wellbore.

Applicants recognized that seismic sources of the invention would be particularly advantageous as effective shear wave generators in the earth at and beneath the seabed floor.

Applicants discovered that a glass sphere having an internal pressure at about atmospheric pressure is an especially advantageous imploding seismic source at the seabed for purposes of the present invention. In another embodiment, an explosive charge is used as an exploding seismic source at the seabed for purposes of the present invention.

In one embodiment of the invention, a glass sphere may be lowered to the seabed by steel reinforced electrical cable. In one aspect, a piston device, which is operated by the pressure differential between atmospheric pressure and the sea floor water pressure, is triggered electrically at a precise time to puncture the sphere causing it to fracture and subsequently implode. Other embodiments include advantageous alternative techniques for imploding a glass sphere at or near the seabed and the deployment of multiple seismic energy sources for purposes of enhanced seismic data acquisition and/or improving the efficiency of seismic data acquisition.

Preferably, the specifications and types of seabed seismic energy sources of the invention are determined by operational considerations, such as the ease of deployment and triggering of the seismic sources, geophysical aspects of the subsurface formations that are to be imaged, and frequency content of the seismic waves that is desirable or necessary for the seismic data that are to be acquired for purposes of borehole and surface seismic surveys.

In yet another embodiment, a system of the invention for seismic data acquisition and imaging includes a deployment apparatus at the sea surface, for example, a winch device that is fitted with steel reinforced electrical cable for deploying one or more seismic energy sources and associated triggering mechanisms to the seabed. A suitable number of sensors, such as hydrophones, or equivalent transducers, are located relative to the seismic sources to precisely determine the locations of the seismic sources at the seabed and to record the precise time of the seismic events. For example, one or more time-break hydrophones may be located at the seabed near the seismic sources for event timing detection and a plurality of position-locating hydrophones may be located near the surface for position determination, using a triangulation method, for example. The steel reinforced cable may be used to trigger the seismic energy sources and to send back hydrophone signals to the surface. A seismic data acquisition tool, for example, a tool having multi-component sensors, such as geophones, is deployed in a well at depths below the seabed to record seismic waves from the seismic events, which travel through the earth formations to the sensors. Advantageously, firing of the seismic sources is precisely synchronized with operation of the seismic data acquisition tool such that the sensors are turned on shortly before the firing.

In accordance with the invention, a single-use seismic energy source is deployable at the sea-bottom and a triggering system fires the energy source at a time synchronized with seismic data acquisition by predetermined receivers such that the energy source generates seismic waves in sea-bottom earth formations for the seismic data acquisition. In one aspect, the firing time is predetermined to an accuracy of 200 milliseconds or better, more preferably, to an accuracy of a fraction of a millisecond. In other aspects of the invention, the receivers may be located in a borehole or at or on the sea-bottom and the seismic waves are in a bandwidth of less than about 100 hertz. A seismic imaging system of the invention includes a seismic energy source apparatus with one or more self-contained energy sources and a triggering device that fires the energy sources at the seabed. A handling system deploys the energy sources at the seabed, at least one sensor determines a position of and a time of firing with respect to each energy source, and receivers at predetermined locations acquire seismic data generated by the energy sources with the seismic data acquisition by the receivers being synchronized with the time of firing of the energy sources. Aspects of the invention include borehole seismic imaging, such as a vertical seismic profile survey, with the receivers being geophones attached with a borehole wall, or a seismic measurement while drilling survey, with the geophones being located inside a drill string. Additional aspects of the invention include a single-use, self-contained energy source for generating shear waves, in a seismic exploration bandwidth, in the earth beneath the sea-bottom for acquiring seismic survey data.

Additional advantages and novel features of the invention will be set forth in the description which follows or may be learned by those skilled in the art through reading the materials herein or practicing the invention. The advantages of the invention may be achieved through the means recited in the attached claims.

BRIEF DESCRIPTION OF THE DRAWINGS

The file of this patent contains at least one drawing executed in color photography. Copies of this patent with color photographs will be provided by the Patent and Trademark Office upon request and payment of necessary fee.

The accompanying drawings illustrate preferred embodiments of the present invention and are a part of the specification. Together with the following description, the drawings demonstrate and explain principles of the present invention.

FIG. 4(A) is for a sea surface source WVSP. FIGS. 4(B) and 4(C) are for a seabed source WVSP, with sea surface reflection shown in FIG. 4(C).

FIG. 5 depicts a modeling and graphical representation of synthetic VSP data showing direct arrival, reflected arrivals and sea surface reflection for a seabed source according to the present invention.

FIGS. 7(A) and 7(B) depict compressional wave modeling and FIGS. 7(C) and 7(D) depict shear wave modeling, in 950 meters water depth, through a gas cloud in subsurface formations. FIG. 7(D) shows direct shear wave following closely behind direct compressional wave.

Figure 1:
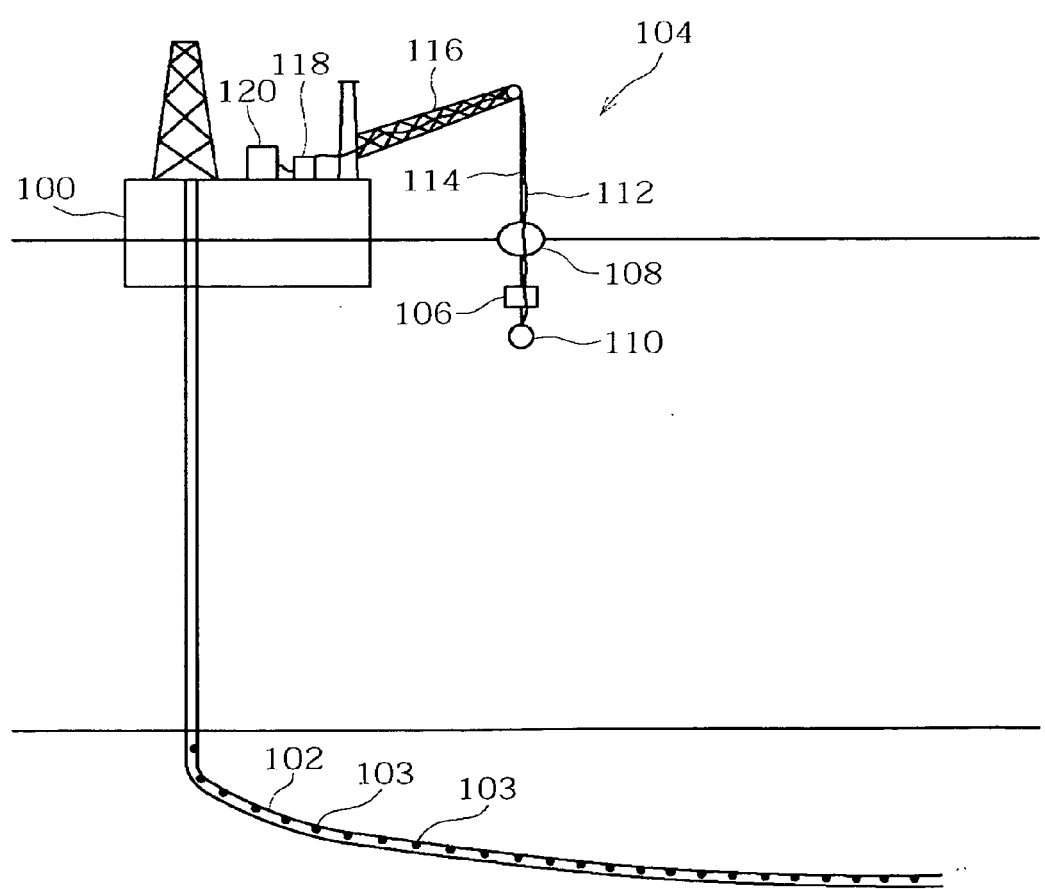
FIG. 1 is a schematic representation of an exemplary system for generating seismic waves at the sea surface.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF PREFERRED EMBODIMENTS

Illustrative embodiments and aspects of the invention are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having benefit of the disclosure herein.

FIG. 1 shows an exemplary system for generating surface seismic waves in a marine environment. An offshore drilling rig 100 is positioned over a subsea borehole 102 having a plurality of spaced receivers 103 to facilitate, for example, a vertical seismic profile (VSP) acquisition. The rig 100 supports a seismic survey apparatus 104 having an air-gun or guns 106 suspended below the water surface by a float or buoy 108. An analog hydrophone 110 is suspended below the air-gun 106. One or more analog lines 112 form part of an umbilical 114 that may also include an air line. The analog lines 112 traverse a handling system, such as a crane 116. The analog lines 112 provide an analog communications/control link between the guns 106, the hydrophone 110, a gun controller 118, and a computer processor 120. The gun controller 118 is arranged on the rig 100, far removed from the guns 106. The position (referring primarily to depth) of the guns 106 is dependent on rig movement, waves, crane operation, and/or other factors.

Applicants' understanding of seismic energy waves, in particular, those generated in a marine environment for purposes of borehole and surface seismic surveys, provides a basis for the novel methods and apparatus disclosed herein. Applicants recognized that low frequency energy transmitted by the earth under the seabed as a consequence of a seabed-situated seismic event is advantageous for purposes of seismic surveys, such as VSP surveys. In this, low frequency energy is propagated through the earth whereas high frequency energy tends to be diffused by the earth. More specifically, seismic energy in the seismic exploration bandwidth is particularly advantageous for purposes of the present invention. More particularly, seismic energy waves less than about 100 hertz, preferably in the range of about 5 to about 60 hertz, are advantageous for purposes of seismic surveys of the invention.

Applicants further recognized that for a surface seismic source, such as an air-gun deployed by way of a surface buoy (note FIG. 1), the ray path of the seismic energy that is generated follows a curved path in the subsurface formations. As a consequence of the dispersed nature of the ray path, the passage of the seismic waves from a surface source through the sea floor can vary significantly, i.e., is dispersed, depending on the subsurface lateral velocity variations. It has been found that data from a surface source are not always consistent from level to level and are difficult to process.

Applicants discovered that in-sea seismic sources of the invention, deployed at or near the seabed, would cause advantageous seismic events at the seabed when activated by suitable triggering mechanisms. Such seismic events, under precisely controlled conditions of location and time, provide seismic data that are suitable for purposes of marine seismic surveys. In this, seismic waves from the seismic events at the seabed will travel with a more direct and predictable ray-path through the earth, to borehole sensors deployed in a well drilled for oil and gas exploration, than a seismic source that is located near the sea surface.

Figure 2:
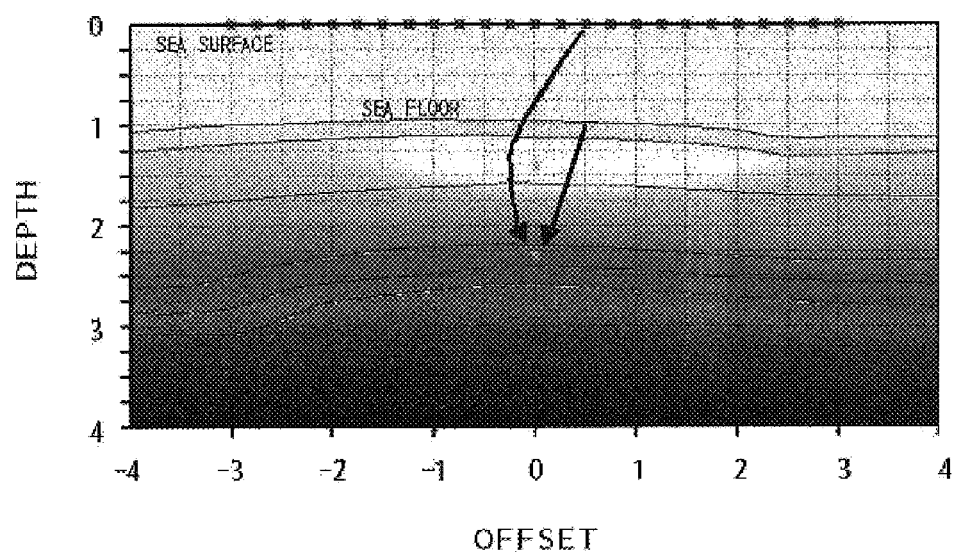
FIG. 2 depicts a modeled comparison of direct ray paths for a sea surface source and a seabed source according to the present invention.

FIG. 2 is a modeled comparison of a direct ray path from a sea surface source and a direct ray path from a seabed source according to the present invention. As evident from FIG. 2, a source fired at the surface will have higher refraction ray paths in the presence of lateral velocity variations. On the other hand, a source situated at the seabed will generate more direct ray paths from the source to a sensor or sensors, such as geophones, which are deployed in a well or at the surface to capture seismic signals.

Figure 3A:
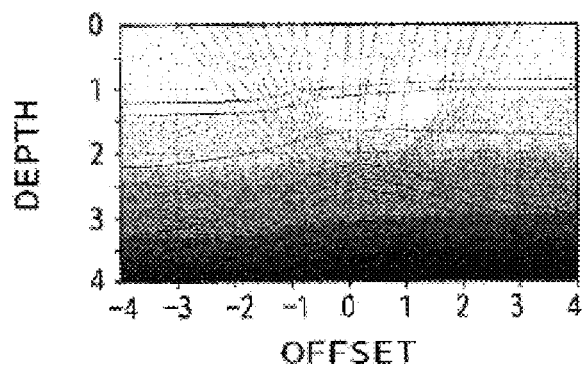
FIGS. 3(A) to 3(C) depict models of ray tracing for a sea surface source walkaway VSP (WVSP), a seabed source WVSP, and a reflection event with a seabed source.
Figure 3B:
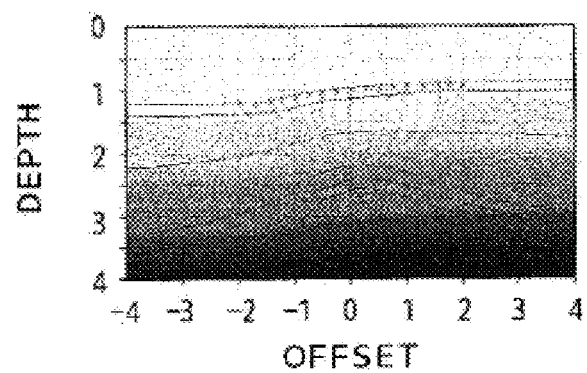
Figure 3C:
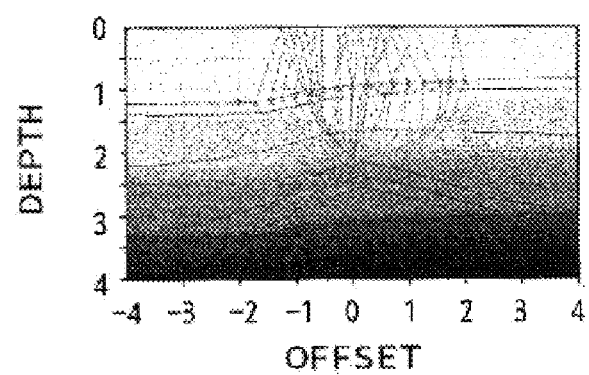

FIG. 3(A) shows a model that represents ray tracing for a surface source walkaway VSP (WVSP). A walkaway VSP has an array of receivers, for example, 8 or more receivers, positioned in a wellbore with a boat having an airgun on it sailed along a line, or a curve, shooting the airgun at regular spacing along the line. In a land environment, a similar configuration may be used, but with a different energy source, such as a Vibroseis™. The line starts at a distance away from the well, for example, at a distance that is equal to about 1.5 times the receiver array depth, and the boat is sailed directly past the rig/well, and out to the same offset on the other side of the well. Typically, a WVSP provides seismic imaging information on either side of the wellbore below the receiver array, and formation velocity information above the receiver array, among other objectives of a typical WVSP. As evident from FIG. 3(A), there will be wide dispersion of the ray tracing over the seabed. FIG. 3(B) shows modeling of ray tracing for a seabed source WVSP according to the invention. The ray tracing in FIG. 3(B) is constrained to an area around the seismic receivers in a borehole. Since with a seabed seismic source the ray path at the seabed is constrained to pass through the seabed at a known point, i.e., the source location on the seabed, the acquired data will be more consistent from level to level and easier to process. In this, subsea seismic sources of the invention will reduce or eliminate uncertainty that is introduced into conventional seismic surveys due to separation of a surface source from the seabed. The offset used for a seabed source of the invention will be less than that of a surface offset source. A seabed source will also record sea surface reflections, but later in time. FIG. 3(C) shows modeling of ray tracing for one reflection event. As evident from FIG. 3(C), the ray tracing is constrained around a central point, i.e., the well location.

Figure 4A:
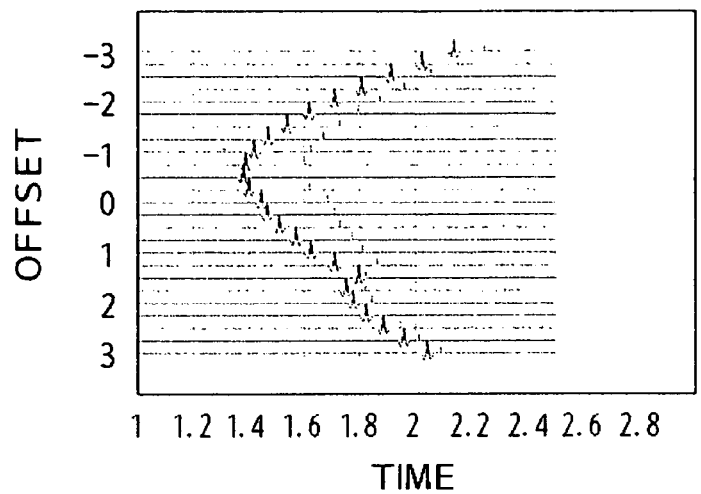
FIGS. 4(A) to 4(C) graphically represent synthetic walkaway VSP (WVSP) data from the ray tracing shown in FIGS. 3(A) to 3(C).
Figure 4B:
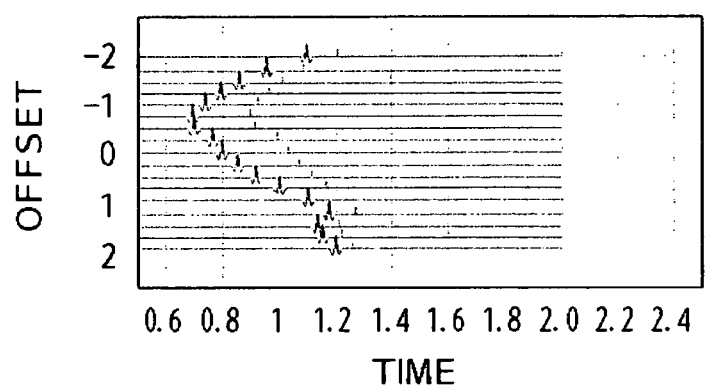
Figure 4C:
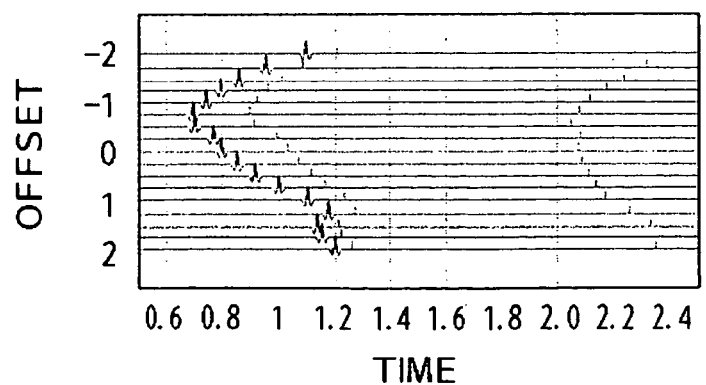

FIGS. 4(A) to 4(C) show plots of synthetic walkaway VSP data from the ray tracing shown in FIGS. 3(A) to 3(C). FIG. 4(A) is for a surface source WVSP and FIGS. 4(B) and 4(C) are for a seabed source WVSP, with the sea surface multiple shown in the last plot. As evident, the sea surface reflection does not smear the main event since it follows more than 1 second behind the main event in the modeled water depths.

In surface source VSPs, rough seas have significant influence on the signals that are received from a surface seismic source. In this, sea swells of 3 meters lead to a 2 milliseconds (msec) static due to a vertical displacement of a surface buoyed seismic source. Larger sea swells have an even more significant effect. For example, when shots are stacked during a rig-side VSP or offset VSP, the change in travel time of each shot results in smearing of the signal during stacking and a loss of high frequencies.

Accordingly, there is presently need for a seismic energy source for marine environments that is easy to handle and operate, and generates seismic data free from inconsistencies resulting from a surface seismic source.

The present invention provides methods and apparatus of generating seismic waves at the seabed by using subsea seismic energy sources, which are deployed at the seabed, such that seismic waves from the sources are constrained to an area around the location of the sources at the seabed. In one aspect, a seismic energy source is provided that generates seismic waves by an implosion at the seabed, such as by way of fracturing a glass sphere having an internal pressure at, or near, atmospheric pressure. In another aspect, a seismic energy source of the invention generates seismic waves by an explosion at the seabed, such as by a precisely controlled explosion of an explosive triggered by a detonator. The seismic sources of the invention are deployed at precisely determined locations and the time of the seismic event or events is accurately monitored. Preferably, the seismic sources of the invention are deployed using a boat at a distance from the drilling rig. Deployment directly from the rig may not be preferred in view of the possibility that the sources may be deployed in close proximity to the wellhead with a chance of damage to the wellhead.

Figure 6:
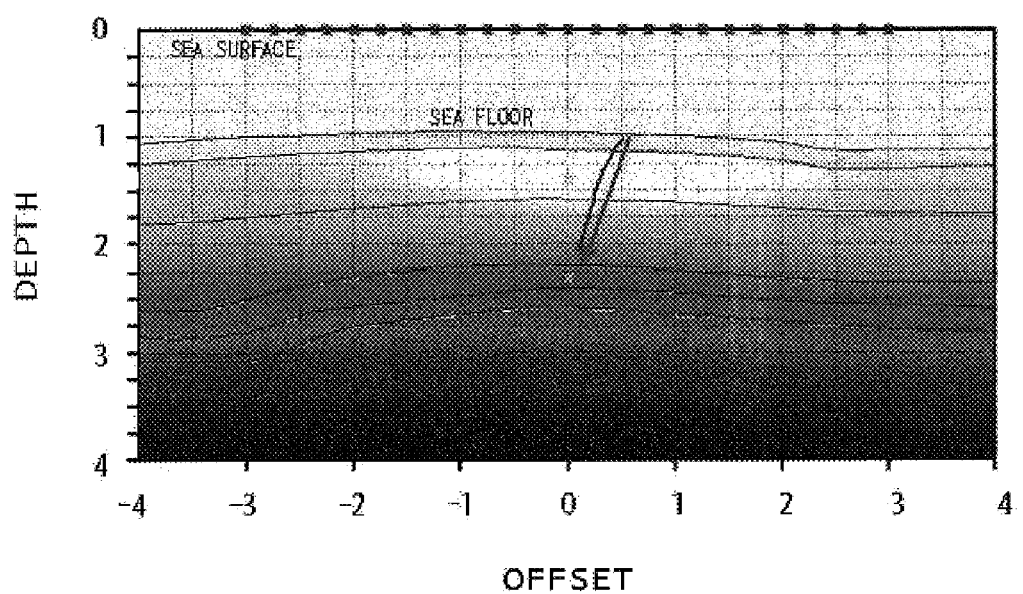
FIG. 6 depicts modeled compressional and shear wave generation for a seabed source according to the present invention.

FIG. 5 depicts a modeling and graphical representation of synthetic VSP data showing direct arrival, reflected arrivals and sea surface reflection for a seabed source according to the present invention. FIG. 6 depicts a model of compressional and shear wave generation for a seabed source according to the present invention. In the presence of a low velocity gas cloud, compressional waves (blue in FIG. 6) will be slowed and refracted, i.e., compressional waves are masked and attenuated by gas. On the other hand, shear waves (red in FIG. 6) will pass unaffected by a gas cloud, i.e., gas entrapped in a formation. A seabed source of the invention will generate shear waves, unlike a sea surface source, since shear waves do not propagate through water.

Figure 7A:
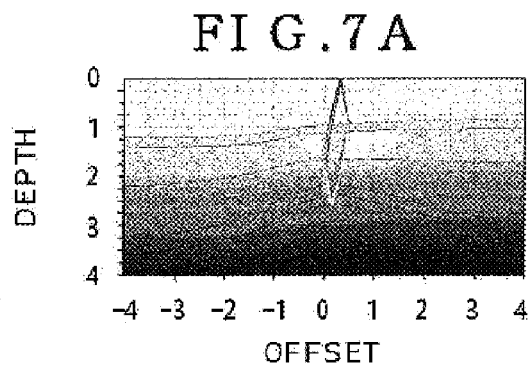
FIGS. 7(A) to 7(D) depict compressional and shear wave modeling for a seismic source deployed at the seabed according to the present invention.
Figure 7B:
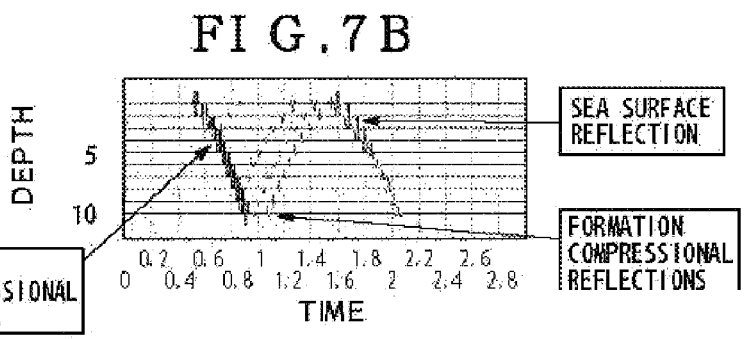
Figure 7C:
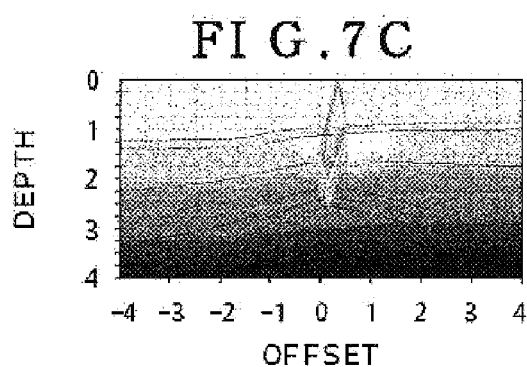

FIGS. 7(A) to 7(D) depict compressional and shear wave modeling of a seismic source of the invention deployed in 950 meters of water depth. A subsurface gas cloud is depicted in FIGS. 7(A) and 7(C). As shown in FIG. 7(A), the compressional wave arrival going down is closer to the gas cloud as a result of the source being deployed at the seabed. Therefore, the compressional wave arrival is less affected by multi-pathed refractions around the gas cloud. The direct arrival compressional wave will be constrained to a more direct path through the gas cloud, and there will be considerably less ambiguity on the ray path direction (note also FIG. 7(B)).

Figure 7D:
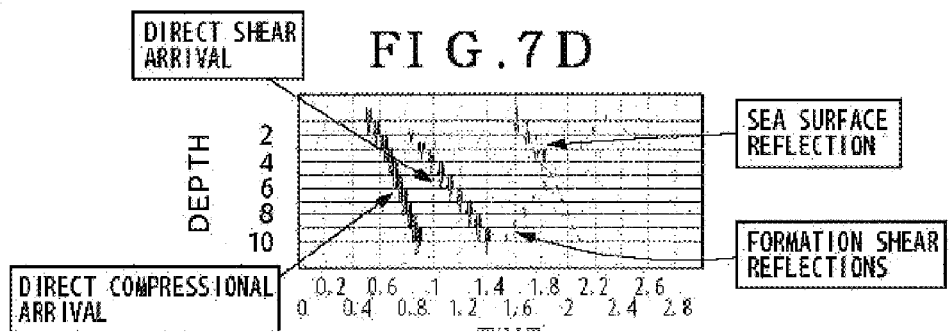

Furthermore, as depicted in FIGS. 7(C) and 7(D), since the source is deployed on the seabed, direct shear wave generation may occur at the source and be seen for offset source locations. The direct shear wave follows closely behind the direct compressional wave.

Applicants further recognized that sea surface reflection (SSR), along with formation reflections coming from the SSR, will dominate the data after a certain time. In consequence, it is preferred that data inside a time window starting from the first arrival be utilized. For example, in 950 meters water depth, a preferred time window for receiving seismic event data is about 1.1 secs from the first break. For 1300 meters water depth, a preferred time window for acquiring seismic data is about 1.6 secs from the first break.

Applicants further recognized that as a consequence of the SSR, a seabed seismic source is particularly advantageous in deepwater settings. For example, compressional imaging may preferably need more than 500 meters water depth, while for shear imaging, more than 800 meters water depth is preferred. Furthermore, a gas cloud degrades compressional imaging, but less so for shear imaging.

In one aspect of the present invention, the seabed seismic source is a single shot source of seismic waves. In contrast with a multiple shot source, which is provided in another embodiment of the invention, a single shot has relatively slow deployment time so it is limited to a small number of offsets. In this, applicants recognized that a single shot source might not always provide the best configuration for walkaway VSP. Nevertheless, a seismic tool having a large array of receivers would maximize the number of levels acquired with each shot. In this, reliability of data acquired by way of a large array of receivers is improved and enhanced. As a consequence, survey time is reduced and uncertainty arising from variables that are inherent in multiple shots, such as maintaining similar positions of multiple seabed sources, is eliminated.

In one possible aspect of a multiple shot source, multiple glass spheres may be fired in one descent using standard wireline multi-shot techniques, such as diode switches, multiple conductors, etc., that are known in oilfield exploration and production. For example, a plurality of glass spheres, such as 4, 6, 8 or more glass spheres, may be simultaneously deployed at the seabed and fired by electrical detonators, one at a time in sequence.

A seismic source of the invention may be utilized for an offset VSP type configuration, or a mini-WVSP configuration. In view of the relatively slow deployment time of a single shot source to the seabed after each shot, a multi-level seismic tool, such as a tool having an array of 8 or more receivers, is preferred to optimize the survey time. A subsea seismic source of the present invention may also be used in sequence with, i.e., alternately or flip-flop, an air-gun source at the rig, during the same logging descent, to expand on seismic data obtained during the seismic survey. A seabed source may not be suitable for a VSP that is acquired with receivers near the seabed, since the signal from the seabed source is likely to be too strong due to close proximity of the tool to the source. In this, a surface air-gun source gives good quality data in the region of the borehole near the sea floor.

The water pressure below the sea surface increases by about 1.44 psi for every 1 meter increase in depth. For a seabed depth of 1000 meters, for example, the water pressure will be about 1440 psi. In the methods and apparatus of the invention, sea water pressure is utilized advantageously to effectuate benefits of the invention.

In one embodiment of the invention, water pressure is used to drive a piston-based triggering mechanism, which in turns fractures a glass sphere deployed at, or near, the seabed. Prior to activation, the piston-based triggering mechanism has internal pressure on both sides of the piston at, or near, atmospheric pressure. A solenoid, or similar device, may be electrically triggered, which releases ambient high-pressure water at the front side of the piston. A shaft protruding from a rear end of the piston device strikes the sphere when water pressure drives the piston in a backward, i.e., toward the sphere, direction.

Figure 8A:
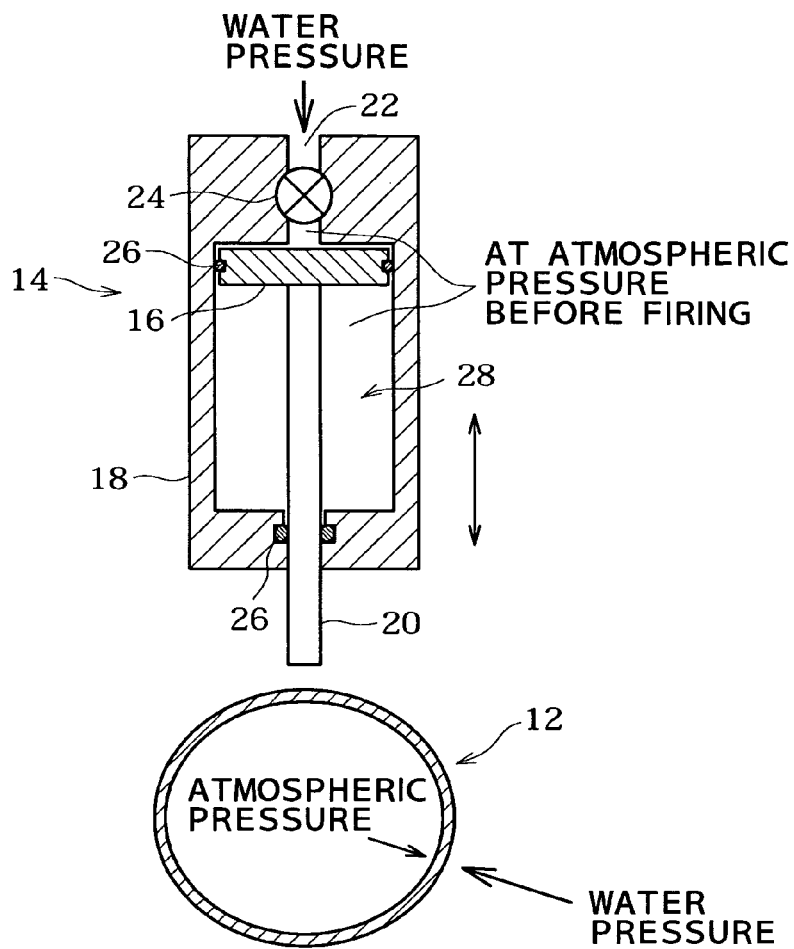
FIGS. 8(A) to 8(C) are schematic depictions of embodiments of imploding sphere apparatuses for generating seabed seismic waves according to the present invention.

FIG. 8(A) is a schematic depiction of one apparatus for generating seismic waves according to some preferred embodiments of the present invention. FIG. 8(A) shows a sea-bottom seismic source apparatus 10 according to the present invention. The embodiment illustrated in FIG. 8(A) includes an imploding sphere 12 and a triggering device 14 for fracturing the glass sphere 12 such that the glass sphere 12 implodes at high water pressure.

Advantageously, the seismic source apparatus 10 may also be structured so as to use an explosive device in place of the imploding glass sphere 12 for generating seabed seismic waves. In this, the apparatus 10 may include an explosive material and a detonator for firing the explosive charge, instead of an imploding sphere 12 and triggering device 14 (depicted in FIG. 8(A)), for deployment at the sea-bottom to generate seismic waves in the earth beneath the seabed.

Referring to FIG. 8(A), the triggering device 14 has a piston 16 structured and arranged in a suitable piston tube 18 so as to be moveable in a forward and backward direction within the space of a closed inner chamber 28 of the tube 18, as represented by arrows in FIG. 8(A). The piston 16 has a shaft 20 extending away from the piston 16 toward the glass sphere 12. The shaft 20 fractures the glass sphere 12 when the piston 16 is driven in the direction of the glass sphere 12 by water pressure, for example. One end of the tube 18, on the other side of the piston 16 from the shaft 20, has an opening 22. A suitable flow control valve 24, such as an electrically-triggered valve, is operable to allow water to enter the inner chamber 28 through the opening 22 in the tube 18 so that the piston 16 is pushed toward the glass sphere 12 and the shaft 20 strikes the glass sphere 12 thereby fracturing the glass sphere 12. The other end of the tube 18, on the side of the shaft 20, has another opening 26 for the shaft 20 to extend out of the tube 18 toward the glass sphere 12. O-ring type seals may be provided as desirable or necessary to prevent water from passing around the periphery of the piston 16 or into the tube 18 by way of the opening 26 for the shaft 20 so that water pressure acts to push the piston 16 within the inner chamber 28.

In operation, the inner chamber 28 is at atmospheric pressure before firing. When the valve 24 is opened, water entering the inner chamber 28 though the opening 22 pushes the piston 16 such that the shaft 20 is pushed toward the glass sphere 12. One end of the shaft 20 impacts the glass sphere 12 with a force that is sufficient to fracture the glass sphere 12 to an extent necessary for the sphere 12 to implode under the pressure of the water surrounding the sphere 12.

Figure 8B:
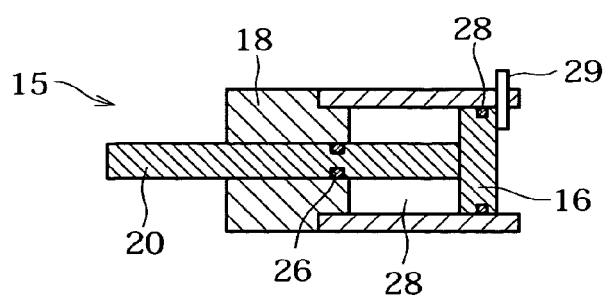
Figure 8C:
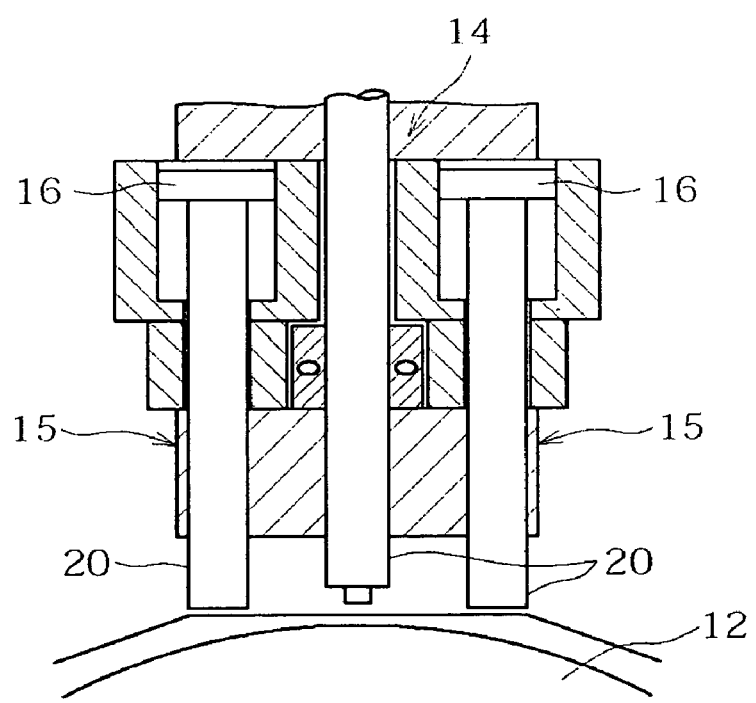

FIG. 8(B) shows an embodiment of a stress piston 15 according to the present invention for inducing a force on the glass sphere 12 so as to weaken the glass sphere 12 for implosion by impact of the shaft 20 of the triggering device 14 (note FIG. 8(A)). The stress piston 15 may be similar to the triggering device 14 with a pin 29 to hold back the shaft 20 to contact the glass sphere 12 (note FIG. 8(C)). FIG. 8(C) shows schematically one arrangement of stress pistons 15 and the triggering device 14 in relation to the flat surface of the glass sphere 12. The surface of the glass sphere may be ground, as illustrated in FIG. 8(C), so as to reduce wall thickness of the glass sphere 12 to facilitate implosion. The stress pistons 15 may be removed if not required for imploding the glass sphere 12.

Referring to FIG. 8(B), stress piston 15 has atmospheric pressure inside the chamber 28. The top of the shaft 20 of the stress piston 15 is placed on the surface of the glass sphere 12 (note FIG. 8(C)). As the apparatus 10 descends into water, the water pressure on the piston 16 of the stress piston 15 induces a force on the glass surface. The stress induced by this force helps weaken the glass sphere 12, and therefore makes it easier to implode.

Figure 9A:
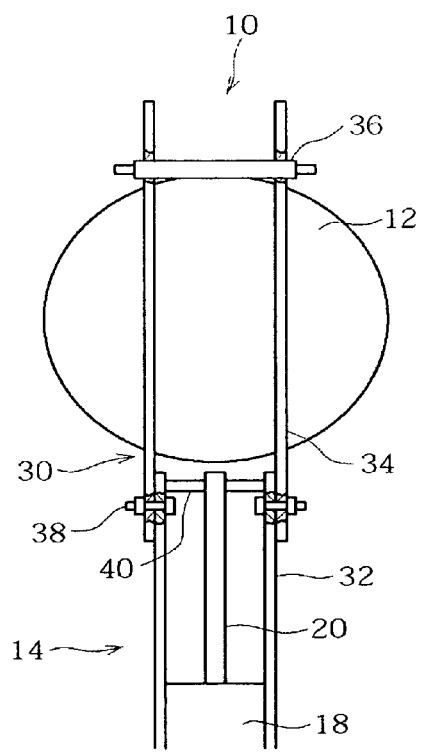
FIG. 9(A) is a side view and FIG. 9(B) is a top view of one frame arrangement for retaining a glass sphere of the apparatus of FIG. 8(A).
Figure 9B:
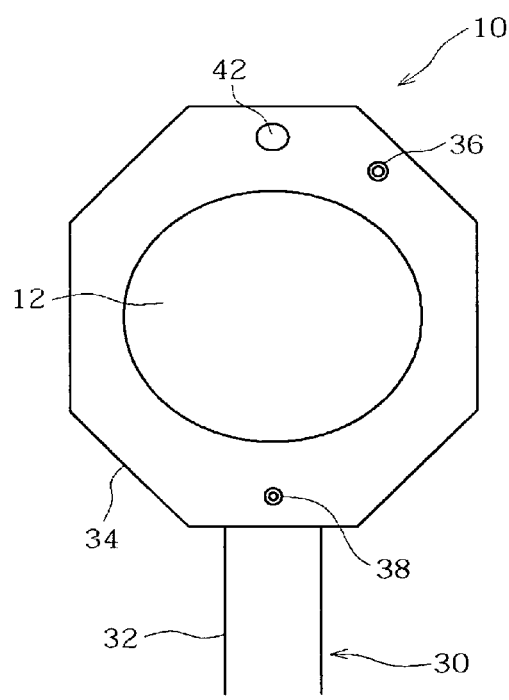

FIGS. 9(A) and 9(B) show schematically one frame arrangement for holding the glass sphere 12 of the seismic source apparatus 10. In one embodiment, the apparatus 10 has a suitable frame structure 30 attached with the triggering device 14. As illustrated in the figures, the triggering device 14 includes the tube 18 with the piston 16 (described above with reference to FIG. 8(A)) and the frame structure 30 holding the glass sphere 12 in relation to the shaft 20 of the piston 16. The glass sphere 12 can be fractured by impact of the shaft 20 that extends from the piston 16 toward the glass sphere 12 when the piston 16 is pushed toward the glass sphere 12.

In a side view of FIG. 9(A), the tube 18 has the piston 16 therein with the shaft 20 protruding out of the tube 18. Side rails 32 of the frame structure 30 extend from the tube 18, parallel with the shaft 20, toward the glass sphere 12. FIG. 9(B) shows a top view of the frame structure 30 with plates 34 (note also FIG. 9(A)) for holding the glass sphere 12. The plates 34 are retained on the side rails 32 by a suitable bolting arrangement 38. Fasteners 36 are provided around the periphery of the plates 34 to hold the plates 34 together with the glass sphere 12 in between the plates 34. In this, the top plate 34 may be removed by opening the fasteners 36 to allow replacement of the glass sphere 12. A guide plate 40 with a hole may be provided at one end of the side rails 32 to guide and support the end of the shaft 20 that is proximate the glass sphere 12. A hole 42 is provided in the frame 34 for suspending suitable weights to overcome the glass sphere's buoyancy so that the seismic source apparatus 10 may be submerged in the sea with the end having the glass sphere 12 down so as to be near the seabed.

Figure 10A:
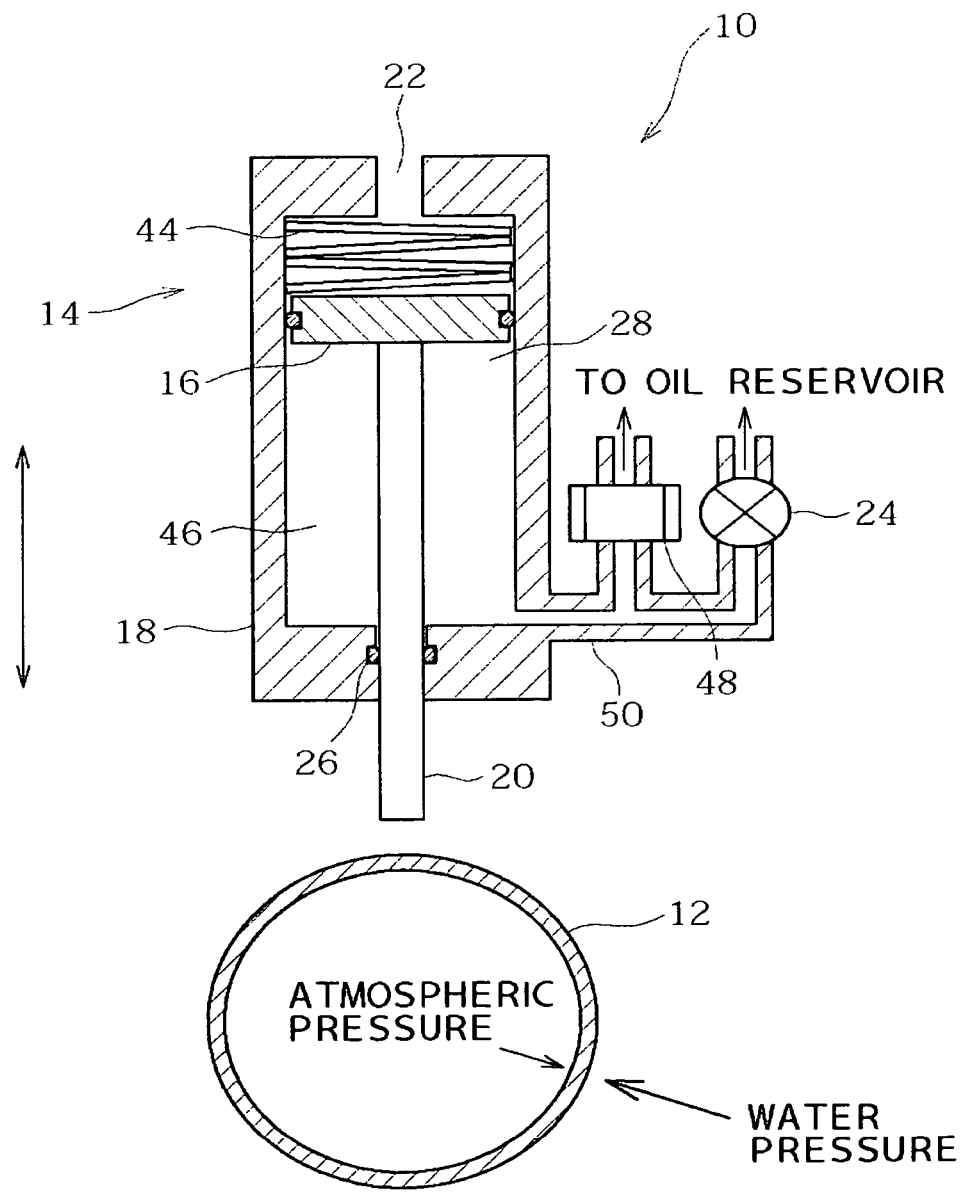
FIGS. 10(A) and 10(B) schematically depict other embodiments of imploding sphere apparatus for generating seismic waves according to the present invention.
Figure 10B:
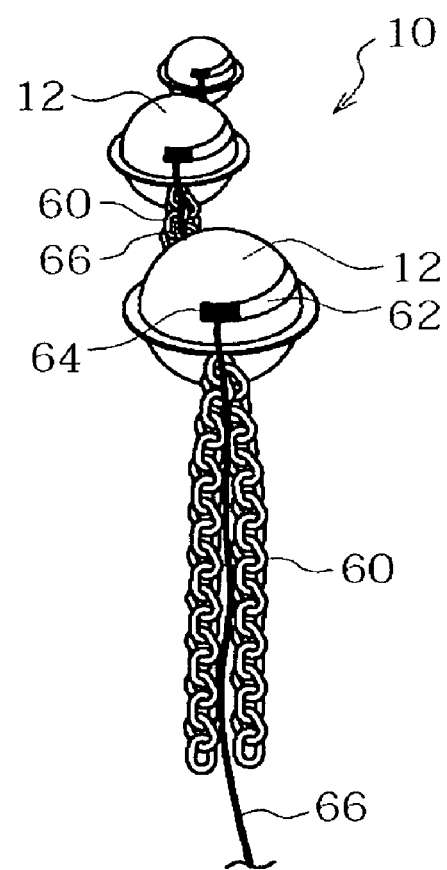

FIGS. 10(A) and 10(B) schematically depict other embodiments of seismic source apparatus 10. FIG. 10(A) illustrates seismic source apparatus 10 having a multi-shot triggering device 14 for fracturing the glass sphere 12 so that the glass sphere 12 implodes at high water pressure. In the present embodiment, multiple glass spheres 12 may be loaded in a suitable frame structure so as to be sequentially imploded to generate multiple shots for seismic data acquisition.

In addition to the elements described above in connection with FIG. 8(A), the embodiment of FIG. 10(A) includes a spring mechanism 44 that may be compressed to provide the driving force for moving the piston 16 with the shaft 20 toward the glass sphere 12. Prior to firing, the spring 44 is maintained in a compressed state by hydraulic oil 46 occupying the inner chamber 28 of the tube 18 and pushing the piston 16 against the spring 44. The opening 22 in the tube 18 serves as an equalizing port. An oil pump 48 and line 50 are provided in an arrangement with the valve 24, which in this embodiment of the apparatus 10 controls flow of hydraulic oil 46 in and out of the inner chamber 28. The oil pump 48 pushes hydraulic oil 46, via the line 50, into the inner chamber 28 against the force of the spring 44 to reset the piston 16 and compress the spring 44 after firing. A hydraulic oil reservoir (not shown) is provided for storing the hydraulic oil 46.

Prior to firing, the piston 16 is pushed against the spring 44 to compress the spring 44 by pressure of hydraulic oil 46 filing the inner chamber 28. The valve 24 may be electrically triggered, for example, to release the hydraulic oil 46 in the chamber 28 such that the piston 16 is pushed by the spring 44 toward the glass sphere 12 and the shaft 20 fractures the glass sphere 12 by impact. To reset the imploding sphere apparatus 10 for another firing, the oil pump 48 is operated to push hydraulic oil 46 from the oil reservoir into the inner chamber 28 by way of the line 50. The oil pressure drives the piston 16 against the pressure of the spring 44 and compresses the spring 44. When the piston 16 is fully retracted to a firing position, the valve 24 is electrically controlled to close thereby maintaining the piston 16 at the charged position until the next firing.

Prior to its fracture, the glass sphere 12 is internally at, or near, atmospheric pressure. When struck by the rear end shaft 20 of the piston 16, which is driven by water pressure in an embodiment shown in FIG. 8(A) and by a spring in an embodiment shown in FIG. 10(A), the glass sphere 12 fractures causing it to catastrophically implode in the order of one or two millisecs (msec). Implosion of the glass sphere 12 results in the release of seismic energy.

As a significant advantage, diameter and wall thickness of the glass sphere 12 may be selected depending upon operational requirements and aspects of the subsurface formations that are to be imaged by the seismic waves generated by implosion of the glass sphere. For example, the sizes of the glass spheres may be varied depending upon frequency content of the seismic waves that is desired or necessary. Similarly, wall thicknesses of the glass spheres may be selected based upon the operational depths and related considerations. In one possible embodiment, a glass sphere having a diameter from about 12 inches to about 17 inches and wall thickness from about 0.25 to about 0.5 inch may be utilized.

As discussed above, in connection with FIG. 8(C), the glass spheres may be pre-weakened to cause an imbalance in the compressional and tensile stresses in the glass when subjected to high water pressure. It is known that spheres having a portion of the outer surface ground down to give a wall thickness of about 0.5 cm on the pole of the sphere will auto-implode at depths around 2600 meters. To cause an implosion at depths of around 1000 meters, the triggering device 14 (note, for example, FIG. 8(A)), which mechanically strikes and fractures the glass, is electrically triggered causing the glass sphere 12 to implode upon command.

Other devices may also be used to initiate an implosion of the glass sphere 12, for example, upon command of an electrical signal from the surface. In one possible aspect of the invention, a piston-based triggering device 14, such as described above, may be a multi-use device (exemplarily depicted in FIG. 10(A)), which can be hydraulically reset after firing so that multiple implosions may be generated. In one embodiment of FIG. 10(A), the multi-use, piston-based triggering device 14 may be driven by a suitable spring at the back of the piston 16 to fracture a glass sphere operatively associated with the triggering mechanism 14. In this, a multi-use triggering mechanism, of the type described, allows sequential implosions or shots upon command, with the deployment of multiple glass spheres 12.

In yet another embodiment of the invention, the glass sphere 12 may be imploded by using, for example, wireline perforating techniques to initiate an implosion, as by a detonator and suitable explosive material, such as an explosive known as primacord, on the end of a logging cable. In this, standard wireline explosive procedures typically used in oilfields may be used to initiate implosion of a glass sphere. Advantageously, in the present embodiment of the invention, the only external power required is for a trigger device. In this, a small amount of power for the trigger device of the detonator and explosive charge is required, but the device is a self-contained, single use seismic source. For example, an electrically fired detonator may be connected to a suitable length of explosive, such as primacord, which is used in oilfield-related applications, placed on the outside of a glass sphere. In this, the hardware, such as detonators and primacord, which can withstand the high fluid pressures encountered at the ocean floor, and techniques for safe deployment of such mechanisms, for example, on steel reinforced electrical cable, are known in the oil industry in techniques such as used to back-off drill pipe. Alternatively, a percussion detonator with a suitable amount of explosive material may be used to implode a glass sphere. The percussion detonator may be struck by a pressure or spring loaded device, upon command from the surface, to fire the explosive and implode the glass sphere.

FIG. 10(B) illustrates yet another embodiment of the seismic source apparatus 10 according to the present invention. In FIG. 10(B), multiple glass spheres 12, with three being exemplarily depicted in the figure, may be strung together by a suitable cable or chain 60 to form a multiple sphere seismic source apparatus 10. Each glass sphere 12 preferably has an explosive material 62, such as primacord, and a detonator 64, such as an electrical detonator, associated with it. Alternative means for imploding the glass spheres may also be used. An electrical conductor 66, or alternative devices, may be used to fire each detonator 64 to implode the sphere 12 as previously described above.

Another possible alternative imploding glass sphere device is, for example a glass sphere having a diameter of about 13 inches, with a timer inside attached to a detonator. In the present embodiment of an imploding glass sphere device, the timer can be programmed for a delay in firing. In this, typical timers can trigger the implosion to within seconds, rather than the fraction of millisecs, which is preferred for VSPs. Advantageously, the present device is totally expendable, i.e., it may be tossed overboard from a boat for deployment. In a walkaway VSP, for example, a plurality of the expendable devices may be deposited in the sea, with suitable weights attached to the devices so that the devices sink to the seabed. The timers associated with the devices may be set to fire at, for example, 1 minute intervals, for some time in the future. This may require use of a tool that can acquire seismic data in a continuous acquisition mode.

Imploding glass spheres according to the invention release more seismic energy the deeper the water depth at which the spheres are deployed. Larger volume, or other designs, of glass spheres may be used for generating seismic waves with more low frequency energy, if such a result is desirable or necessary for purposes of seismic data acquisition.

In contrast with conventional seismic sources, imploding glass spheres of the invention are single use, intrinsically safe, disposable energy sources for generating seabed seismic waves. In this, after its operation only sand size particles of glass remain deposited on the ocean floor, which provides for environmentally friendly marine seismic surveys.

Figure 11A:
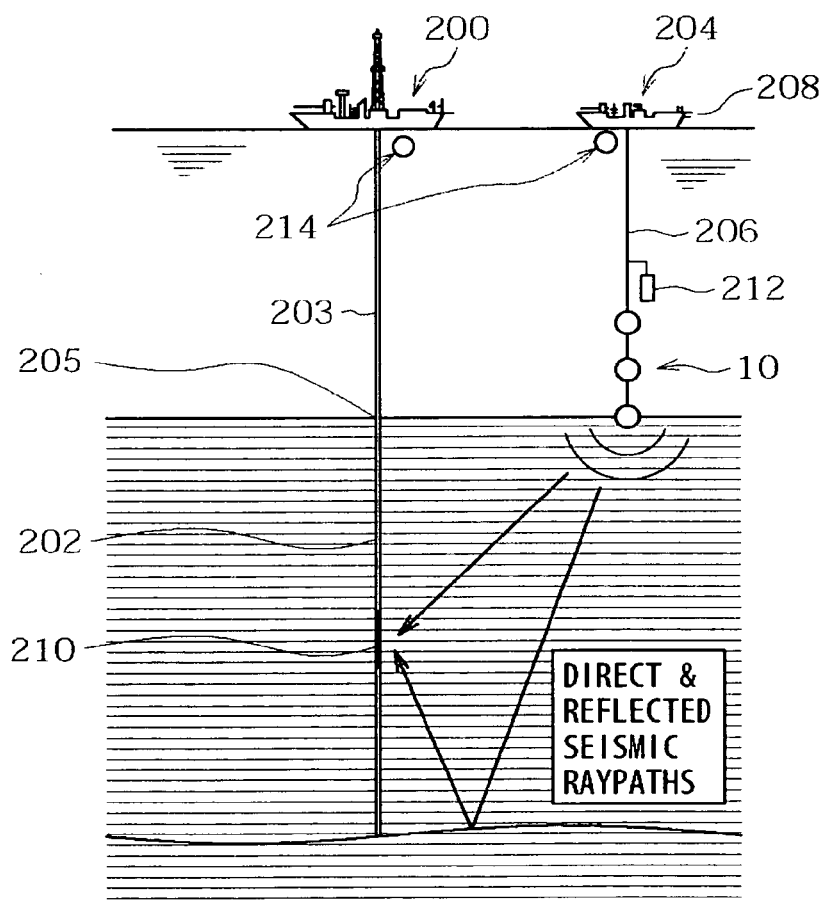
FIG. 11(A) is a schematic depiction of one system for generating seismic waves and acquiring seismic signals from a seabed source apparatus according to the present invention and FIG. 11(B) schematically illustrates yet another embodiment of an imploding sphere apparatus as depicted in FIG. 11(A).
Figure 11B:
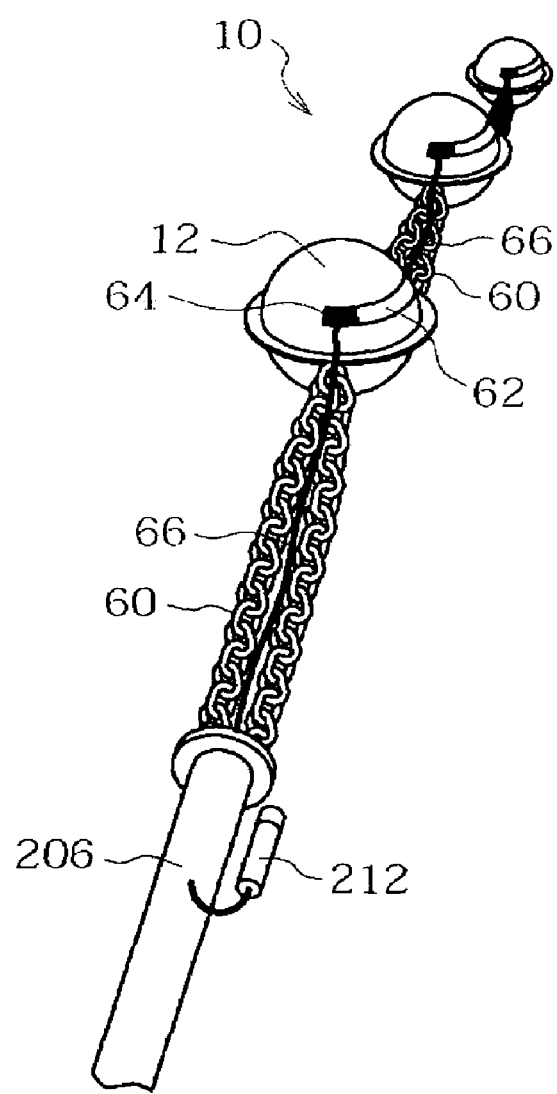
Figure 12:
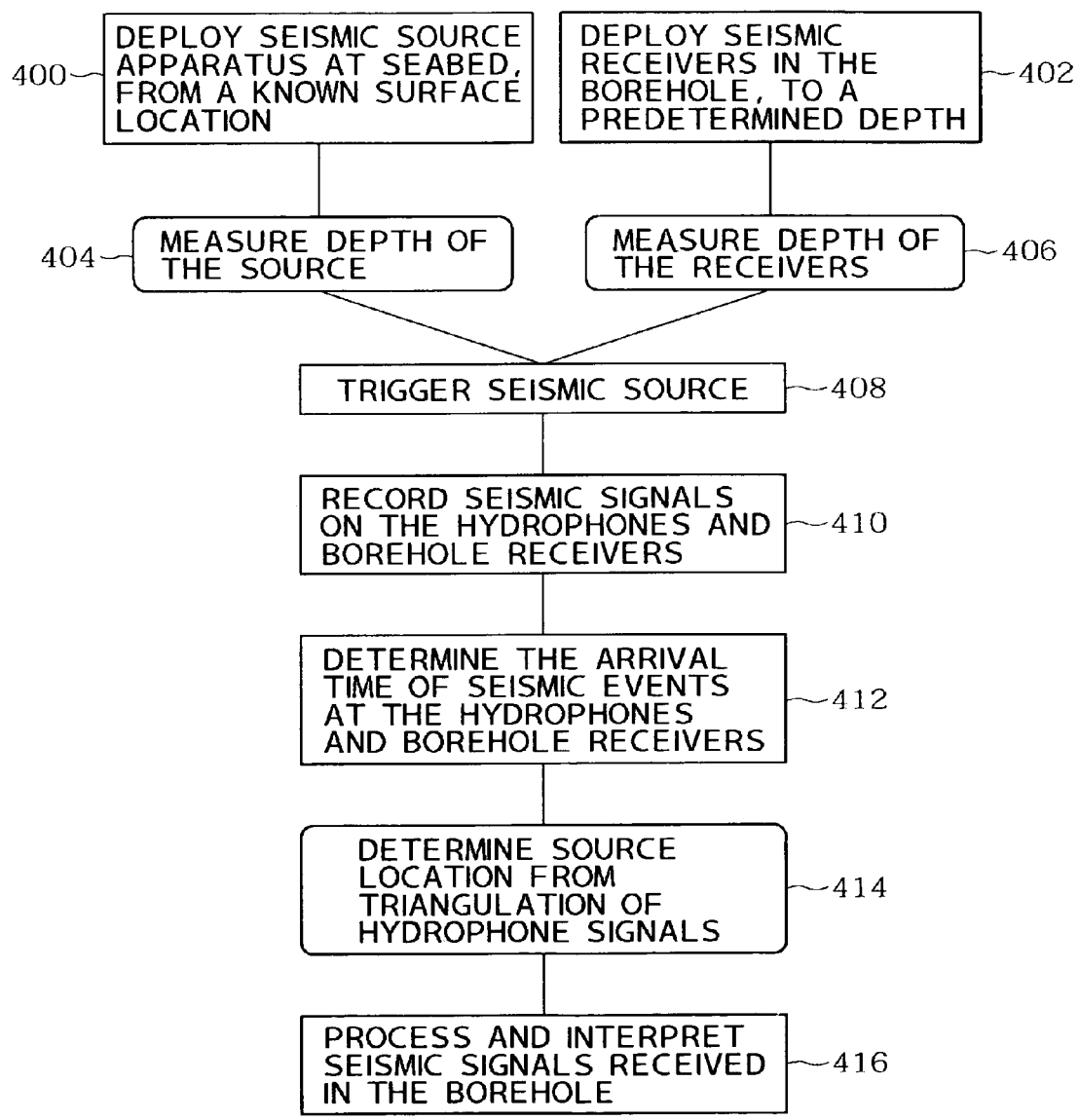
FIG. 12 is a schematic illustration of a method for generating seismic waves and acquiring seismic signals from a seabed source apparatus according to the present invention.

FIG. 11(A) is a simplified depiction of an arrangement for generating seismic waves and acquiring seismic signals from a seabed source according to the present invention and FIG. 11(B) schematically illustrates another embodiment of a seismic source apparatus 10 having multiple glass spheres 12 (note also FIG. 10(B) and related description). FIG. 12 is a schematic illustration of a method for generating seismic waves and acquiring seismic signals from a seabed source according to the present invention. Referring to FIG. 11(A), a drilling rig 200 is located at the sea surface over a subsea borehole 202 with a riser 203 connecting the rig 200 with the borehole 202. In this, the drilling rig or ship may also be a semi-submersible. A blowout preventer 205 is provided at the top of the borehole 202 to provide hydraulic isolation between the borehole and the ocean.

In one embodiment of the invention, a winch device 204 on the surface is fitted with, for example, steel reinforced electrical cable 206 for deploying a sea-bottom seismic source apparatus 10, which has a seismic source and triggering device, to the seabed. Preferably, the winch 204 may be located on a boat 208 near the drilling rig 200, for example, so the apparatus 10 can be deployed to the seabed at a distance from the drilling rig 200 to avoid damage to the subsurface string, blow-out preventer, etc., by seismic waves that are generated on operation of the device. Preferably, a wireline logging cable that is run inside oil and gas wells, to assist in evaluation of the geologic formations and fluids in the well, may be used as a cable for deploying the device in the ocean. Such a cable may advantageously provide electrical connection with sub-sea devices and depth measurement functionality using, for example, an Integrated Depth Wheel apparatus.

Alternatively, if a winch device is located on a drilling rig, and not on a boat at a distance from the rig, then a seismic source apparatus of the invention may be deployed down an anchored cable that is strung prior to the seismic survey. In this, the seismic source should be located sufficient distance from a wellhead on the seabed to ensure that damage to the wellhead will not occur when seismic waves are generated, for example, when a glass sphere is imploded.

FIG. 11(B) schematically illustrates one embodiment of a multiple sphere seismic source apparatus 10 according to the present invention in a configuration that is suitable for deployment in the arrangement depicted in FIG. 11(A). As shown in FIG. 11(B), multiple glass spheres 12 may be held together by chains 60 to form a series of connected glass spheres. Preferably, the glass spheres 12 are separated by a suitable distance or intervening device so as to avoid simultaneous implosion of the glass spheres. One end of the connected glass spheres is free to hang in a downward direction in the sea at a position close to the seabed. The other end of the connected glass spheres may be attached with the logging cable 206 (note FIG. 11(A)), for example, a seven-conductor steel reinforced electrical cable, or other suitable cable. A sensor 212 for recording the event time may be positioned at a known distance from the top glass sphere 12, for example, 2 meters from the top glass sphere 12. Each glass sphere 12 may have an explosive material 62, such as primacord, and a detonator 64, such as an electrical detonator, associated with it. An electrical conductor 66, or alternative devices, may be used to fire each detonator 64 to implode the associated sphere 12.

Referring to FIGS. 11(A) and 12, as described above, the seismic source 10 is deployed using, for example, a wireline winch unit 204 on the boat 208 (Step 400). In one embodiment, a seismic tool 210 with multi-component sensors or receivers, such as a plurality of geophones, may be deployed (Step 402), for example, in a borehole, to a predetermined depth to record seismic signals that are generated by the seismic source apparatus 10. Depth to the source 10 is measured from the winch unit 204 (Step 404) and depth of the receivers is determined (Step 406). Some form of navigation is also preferred. In this, normal boat navigation may be sufficient, but the boat position may not necessarily correspond to the location of the source 10 at the seabed. A crane (not shown), or a similar device, may be used to hang a sheave wheel over the side of the boat 208 for the cable 206.

The seismic source apparatus 10 may be fired (Step 408) by any one of the various embodiments of the invention described above. A hydrophone or other sensor 212, located near the seismic source 10, receives seismic signals to record time of the seismic event or events and the seismic signals are also received by the receivers 210 (Step 410). The arrival time of the seismic event or events is determined at the sensor 212 and receivers 210 (Step 412). A time of the event may also be determined from one or more hydrophones 214 located near the sea surface, vertically above the seismic source 10. If the distance between the hydrophones 212 and 214 is known, the intervening water velocity can be computed.

A second set of hydrophones 214 may be deployed at known and predetermined locations near the sea surface, and using a triangulation technique, for example, the exact location of the seismic source 10 at or on the seabed can be determined (Step 414) when it implodes or explodes. The seismic data received by the receivers 210 may be processed and interpreted (Step 416) in accordance with seismic survey techniques.

Figure 13A:
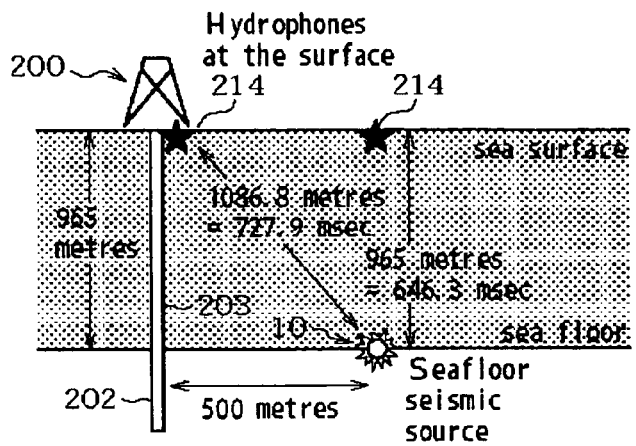
FIGS. 13(A) to 13(C) show techniques for determining position of a seismic source according to the present invention after deployment at the seabed.
Figure 13B:
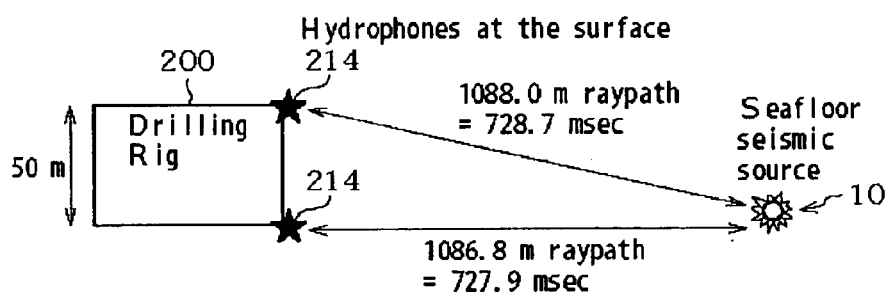
Figure 13C:
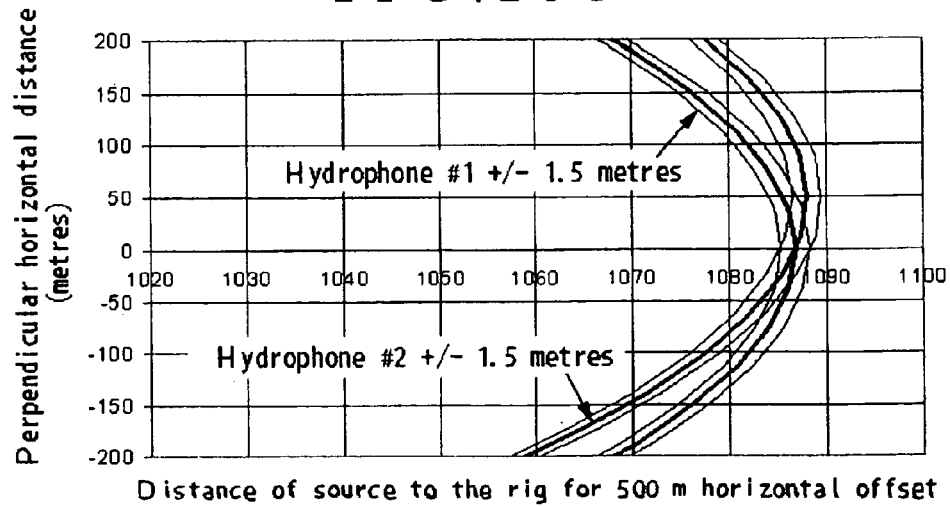

FIG. 13(A) to 13(C) depict exemplary techniques for determining a position of the seismic source 10 deployed at the seabed. FIG. 13(A) is a side view of the seismic source 10 in relation to the drilling rig 200. FIG. 13(B) is a plan view of an exemplary triangulation technique with two hydrophones 214 at the drilling rig 200. FIG. 13(C) graphically depicts accuracy of the triangulation technique for two hydrophones 214 in the water near the drilling rig 200 at 0 meter and 50 meters horizontal distance, respectively.

As depicted in FIG. 13(B), two hydrophones 214 located on the drilling rig 200 can be used to triangulate the source location. However, due to a small offset between the two hydrophones 214, which is limited by the width of the rig 200, the azimuth of the source 10 from the rig 200 will be less accurate than the offset. The water velocity may be determined by a test shot with the source 10 suspended on the cable 206 close to the seabed, but not actually on the seabed. In this, the water velocity may be computed by recording the time break at the source 10 and a hydrophone 214 near the surface, and knowing the length of the cable 206. Lateral drift of the source 10 caused by ocean currents should not significantly affect the result. Examples in FIGS. 13(A) to 13(C) use a water velocity value of 1493 m/sec.

In the example depicted in FIG. 13(C), the error envelope is 4 meters on the x-axis and 150 meters on the y-axis. However, if transit time can be picked to better than 0.2 msec, the errors will be reduced by a factor of 5. After the source distance is calculated, and knowing the water depth, the source offset can be computed.

Distance error caused by wrong water velocity may be determined. Taking the transit time of 727.9 from FIG. 13(A), if water velocity of 1483 m/sec is used, a distance of 1079.5 meters is obtained. However, if water velocity of 1503 m/sec is used, a distance of 1094.0 meters is obtained. Therefore, an error in the water velocity of 10 m/sec will give a distance error of about 7 meters for a horizontal offset of 500 meters in 965 meters water depth.

Pingers may also be used to determine the location of the seismic source 10 on the seabed. A similar triangulation technique as described above may be used with the pinger detectors, such as the hydrophones, on the rig. In this, a pinger is advantageous in determining source location before the shot. Another method of utilizing pingers is to run several navigated traverses with a second boat near the area of deployment.

Referring to FIGS. 13(A) and 13(B). In the absence of the hydrophone 212, the shot time may be determined by using a hydrophone 214 (note FIG. 13(A)) located, for example, 5 meters below sea level at the boat 208. An accurate measure of water velocity to the seabed, and the seabed depth is required to determine the actual shot time. Two other hydrophones 214 (note FIG. 13(B)) may be deployed from the rig 200, one on each corner of the rig at, for example, 5 meters depth below sea level. The position of these hydrophones needs to be accurately known, then the X-Y location of the source on the seabed can be determined from the break times measured by these hydrophones.

Preferably, the hydrophones 214 deployed are high sensitivity hydrophones, with more sensitivity than the hydrophones typically placed near an air-gun for break detection. The hydrophone data are preferably recorded at a high sample rate, such as 0.1 msec or better, since very little frequency loss of the signal is expected when going through the water layer.

In one embodiment of the invention depicted in FIG. 11(A), a sensor tool 210 with multi-component sensors is deployed in the well 202 at selected depths below the seabed. After the seismic source 10 is triggered (Step 408 in FIG. 12), the sensor tool 210 records seismic waves from an implosion or explosion (Step 410 in FIG. 12), which travel through the earth to the sensors. In this, a multi-level tool is preferred, so that data at many levels can be recorded with one shot.

In one possible aspect of the invention, the sea-bottom seismic source apparatus 10 may include a suitable explosive situated at or on the seabed floor to be detonated at a predetermined time by a detonator to generate seismic waves in seabed earth formations by an explosion event. For example, several hundred grams of an explosive material may be used to generate seismic waves in the seabed formations. In this, the size of the explosive device may be determined based on, for example, the depth of the formations to be imaged and acoustic properties thereof. Preferably, a suitable triggering device for firing the explosive device at a precisely determined time by remote control may be utilized. Pingers or other suitable position-locating devices may be used to fix the position of the seismic source 10 at the seabed. Advantageously, a predetermined number of explosive seismic source devices, each having a suitable amount of explosive material associated with a remote triggering device and position-locating device, may be deposited at the seabed and then detonated to provide multiple seismic events for acquisition of seismic survey data.

The recording of a plurality of hydrophones may be synchronized with a sensor apparatus having multi-component sensors deployed in a well. These methods and apparatus are discussed in more detail in co-pending U.S. patent application Ser. No. 10/439,904, having common ownership with the present invention, which is hereby incorporated herein by reference in its entirety.

Figure 14:
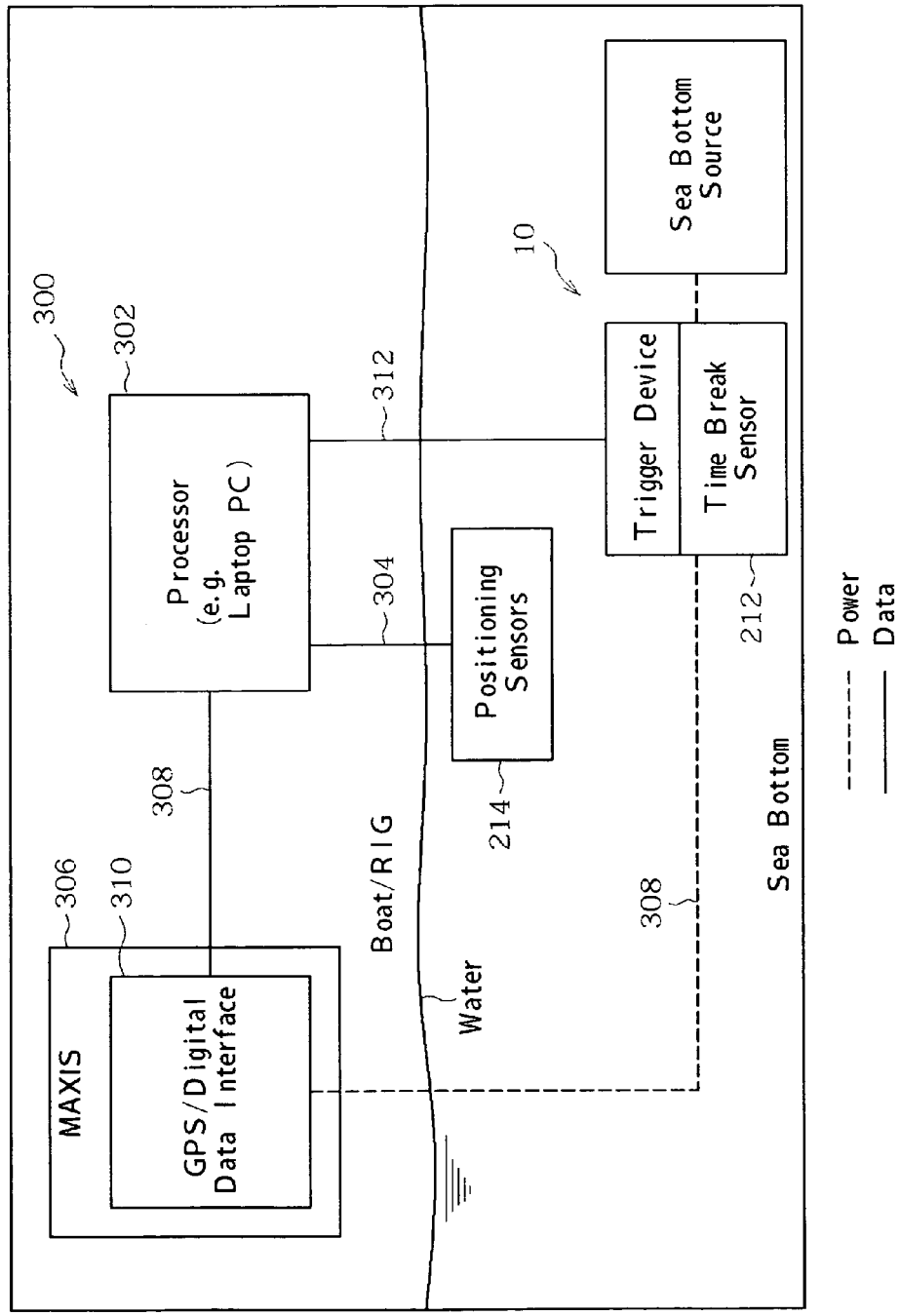
FIG. 14 is a schematic depiction of one seismic data acquisition system in accordance with the present invention.

FIG. 14 is a schematic illustration of one seismic data acquisition system 300 configuration according to aspects of the present invention. A processor 302, such as a laptop computer running a digital source control program, may control and/or monitor the positioning sensors 214, described above with reference to FIG. 11(A). The communication interface between the processor 302 and the sensors 214 is preferably a digital link 304. The digital link 304 may be used for pre-testing the system 300 in preparation for data acquisition.

The processor 302 may also link with an acquisition and imaging system 306, for example Schlumberger's MAXIS™ (Multitask Acquisition and Imaging System) system, via another digital interface 308. The acquisition and imaging system 306 may include a GPS digital data interface 310. Alternatively, the processor 302 may contain a GPS digital data interface 310. The processor 302 and acquisition and imaging system 306 may be located on the rig 200 (note FIG. 11(A)) and the positioning sensors 214 may be located in the water in relation to the sea-bottom seismic source apparatus 10 (note FIG. 11). The time-break sensor 212 and the seismic source apparatus 10 may receive power and control signals from the acquisition and imaging system 306 through the cable 308. The seismic source apparatus 10 and time-break sensor 212 may also have a digital interface 312 with the acquisition and imaging system 306. The direct digital interface 312 may provide the primary interface with the acquisition and imaging system 306 during data acquisition. Table 1, below, provides information about commercially available glass spheres used in field tests. Also described below are exemplary field test conditions.

TABLE 1

| Manufacturer: | Benthos Inc., Massachusetts, USA. | |
|---|---|---|
| Type: | Low expansion borosilicate | |
| Thermal Coefficient of Expansion: | $38 \times 10^{-7}/°$ C. | |
| Specific Gravity: | 2.22 | |
| Young's Modulus: | 62 GPa ($9 \times 10^6$ p.s.i.) | |
| Poisson's Ratio: | 0.20 | |
| Refractive Index: | 1.48 | |
| Thermal Conductivity: | 0.0023 calorie cm/cm$^2$ sec° C. | |
| Dimensions: | 2040-13V | 2040-17V |
| Outside Diameter: | 13 in. (33.0 cm) | 17 in. (43.2 cm) |
| Inside Diameter: | 12 in. (30.5 cm) | 15.9 in. (40.4 cm) |
| Weight in Air: | 20 lbs. (9.07 kg) | 39 lbs. (17.7 g) |
| Buoyancy: | 23 lbs. (10.4 kg) | 56 lbs. (25.4 kg) |
| Depth Rating: | 36,202 ft. (11,034 m) | 22,000 ft. (6,700 m) |

Conditions for field test:
  A seismic source based upon an imploding sphere apparatus of the present invention.
  Known location of the seismic source on or near the seabed.
  Seismic source triggered electrically, with the implosion occurring within a short time thereafter; a delay of up to a few hundred msec may be tolerated.
  A wireline logging winch unit on the boat with two sheave wheels to run the cable with top sheave supported by the boat crane.
  Offset shooting equipment to "fire" the seabed source by remote from the logging unit on the rig.
  Two or more hydrophones on the rig to triangulate the source position.
  One or more hydrophones at the boat and one seabed time break detection sensor.
  Hydrophone record length=2.0 sec at 0.1 msec sample rate.
  Borehole receiver recording length=5 sec at 1 msec sample rate.

Travel time of seismic energy through subsurface formations to a geophone or geophones is determined by subtracting the seismic event time from the time the first arriving energy is received at the geophone or geophones. When multiple source-receiver locations are recorded, tomographic techniques may be used to compute a velocity map of the formations between a seismic source and the sensors.

A difference between conventional VSPs and a VSP using a seabed seismic source is that a VSP based on a seabed seismic source will contain a strong reflection from the sea surface that will follow behind the first arrival by a time that is equal to twice the water depth divided by water velocity. In this, either muting or deconvolution techniques may be used if it is necessary or desirable to remove the sea surface reflection (SSR). However, optimal seismic images can also be expected when the reflection event is far removed in time from the direct arrival, as in the case of deepwater environments.

Seismic reflection images are extracted from the full waveform data of multi-component borehole sensors. The processing techniques used are similar to those used to process data recorded using a source located near the sea surface. Such surveys are known as Vertical Seismic Profiles (VSP), previously discussed above. The advantages of SSR may be derived outside of the seismic event. However, a seabed source of the invention also gives advantageous SSR and may be used in interpretation of the seismic event. In the case of a seismic source on the seabed according to the present invention, which is offset from the well location, SSR will be delayed in time and will have a different, i.e., closer, apparent offset. Therefore, in data acquired by way of a seabed seismic source, actually data from two apparent offsets are acquired in one shot.

Figure 15:
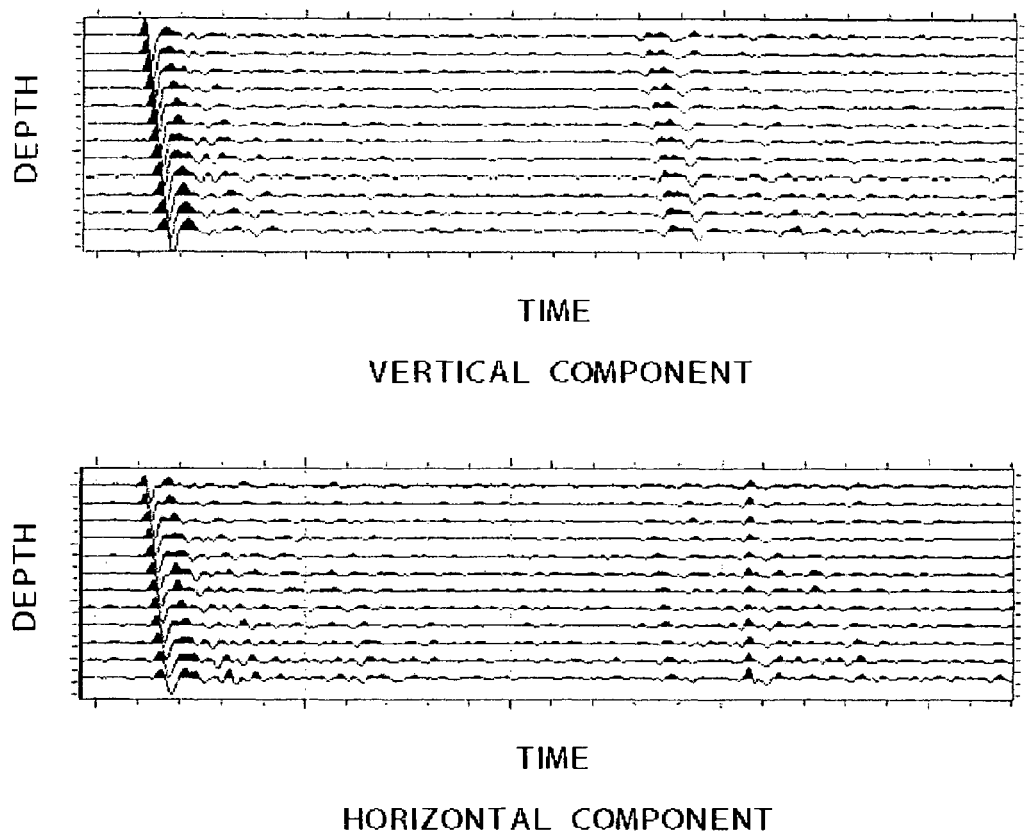
FIG. 15 shows plots of VSP data derived from a shot during field tests.

FIG. 15 shows plots of VSP data from field trials of the vertical component and horizontal component data. As evident from FIG. 15, the waveforms recorded downhole from an imploding sphere seismic source of the invention have advantageous characteristics when compared with a sea surface air-gun source.

In a further embodiment of the invention, the seismic energy source apparatus of the invention may be combined with an Ocean Bottom Cable (OBC) or Q-Seabed™ survey. Typically, an OBC includes a set of seismic receivers deployed on or at the seabed, for example, receivers in the form of a streamer or coiled cable. In this, the same advantages may be obtained as with VSP surveys described herein. For example, the down going P wave is constrained to a more predictable path through sub-surface formations. Moreover, in the case of a hard seabed, the seabed may also generate shear waves at the seabed-situated seismic energy source of the invention.

In yet another embodiment of the invention, the seismic energy source apparatus of the invention may be combined with seismic measurement while drilling, for example, Schlumberger's Seismic Vision While Drilling (SVWD). Co-owned U.S. Pat. No. 6,308,137, is one example of patents relating to the foregoing techniques, which is hereby incorporated herein by reference in its entirety. Seismic measurement while drilling does not have the same constraints on productivity as VSP surveys. The seismic energy sources of the invention may be particularly advantageous for seismic measurement while drilling since only one shot every drill pipe stand needs to be acquired and a new seismic source apparatus, such as a new glass sphere or a set of glass spheres, may be deployed within the time it takes a drilling rig to drill one pipe stand.

In yet another embodiment of the invention, a precision clock, for example from SVWD, may be used after being synchronized with GPS and MAXIS at the surface (note FIG. 14 above and accompanying description). The synchronized clock may be placed inside a seismic source apparatus of the invention, for example, a glass sphere or explosive device along with a detonator, and be programmed to fire at set times in the future. One or more seismic source apparatuses may then be deployed by throwing the apparatuses into the water, without need anymore for a logging cable to deploy the apparatuses. A precision clock synchronized to MAXIS and Schlumberger's Versatile Seismic Imager (VSI) is discussed in the aforementioned U.S. patent application Ser. No. 10/439,904, incorporated herein by reference. Accordingly, the seismic sources of the invention may be fired at a precise future time with estimated accuracy +/−0.25 msec.

In yet another embodiment of the invention, the seismic energy source apparatus of the invention may be combined with a sonar receiver that is placed, for example, along with a detonator outside a glass sphere. In this, one or more glass spheres may be fired selectively by pinging the sonar receiver with coded sonar pulses. As in the other embodiments described above, the seismic source apparatuses of the present embodiment may be deployed, for example, by throwing the apparatuses overboard from a boat, without need for a logging cable for purposes of deployment. In the present embodiment of the invention, extra surface hydrophone sensors may be deployed to determine actual location or locations of the one or more apparatuses by suitable position locating methods, such as a triangulation method described above.

In-sea, single use seismic energy sources of the invention have significant advantages over known devices. For example, known devices are not designed to generate seismic waves at the seabed. In known devices the firing mechanism is fired at an approximate depth as a sphere descends in the ocean, but a precise depth and time of implosion are not pre-determined for purposes of borehole and surface seismic surveys. As previously discussed above, a seabed seismic energy source of the invention is also immune to sea swells in rough weather. Seismic energy sources of the invention, which are deployed on or near the seabed, are relatively stationary and not subject to sea surface vertical displacements, resulting in consistent travel time of each shot. Although VSPs based on seismic energy sources of the invention contain a reflection from the sea surface, such a reflection is in the order of a second or more after the first arrival in contrast to milliseconds after the first arrival with a surface seismic source used in conventional VSPs.

Unlike conventional seismic sources that require a flow of high-pressure air and/or hydraulic oil for operation, the seabed devices of the invention are self-contained energy sources requiring no external power other than for a triggering device used to puncture the shell of an imploding glass sphere or to activate other explosive seismic sources according to the present invention. Unlike conventional seismic sources, a single-use, in-sea seismic device is intrinsically safe with no special handling or storage procedures needed since conventional oilfield safety and handling procedures may be followed for the handling and deployment of seismic energy sources of the present invention.

Applicants recognized that a direct and predictable raypath through the earth formations, generated from a seabed seismic source, is particularly effective for seismic surveys of the invention if there are lateral velocity variations in the formations below the seabed, and in deepwater environments.

Applicants also realized that a seismic energy source located near or on the seabed would be better able to induce shear waves in the formations below the seabed, than a seismic source located near the sea surface.

Applicants discovered that by using a seismic energy source on or near the seabed more accurate velocity information for subsurface formations between the source and receivers can be obtained.

Applicants also discovered that enhanced seismic reflection images of earth formations near and below borehole sensors deployed in a well may be obtained by seabed seismic energy sources of the invention.

The preceding description has been presented only to illustrate and describe the invention and some examples of its implementation. It is not intended to be exhaustive or to limit the invention to any precise form disclosed. Many modifications and variations are possible in light of the above teaching.

The preferred aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims.

What is claimed is:

1. An in-sea seismic source apparatus configured for deployment in deep water to generate seismic data for acquisition by receivers at predetermined locations in a borehole, the apparatus comprising:
   one or more self contained energy sources configured to generate seismic waves by implosion, and a triggering system configured for firing the energy sources;
   a handling system configured for deploying the energy sources in deep water; and
   at least one sensor configured for determining a time of firing with respect to each energy source with an accuracy better than 1 millisecond,
   wherein the apparatus is configured to synchronize seismic data acquisition by the receivers in a borehole, source firing, and determination of time of firing by the at least one sensor,
   the apparatus being further configured for deployment in deep water having a depth of 500 meters or more and for firing the energy sources under precisely controlled conditions of location and time.

2. The seismic source apparatus claimed in claim 1, wherein the accuracy of the firing time is a fraction of a millisecond.

3. The seismic source apparatus claimed in claim 1, wherein the energy source generates seismic waves in a bandwidth less than about 100 hertz.

4. The seismic source apparatus claimed in claim 3, wherein the seismic bandwidth is from about 5 hertz to about 60 hertz.

5. The seismic source apparatus claimed in claim 1, wherein the triggering system comprises a detonator and remotely-operable device for firing the detonator attached with the energy source.

6. The seismic source apparatus claimed in claim 1, wherein the triggering system comprises a precision clock for firing the energy source at a predetermined time having an accuracy of 200 milliseconds or better.

7. The seismic source apparatus claimed in claim 1, wherein the triggering system comprises a piston and shaft arrangement for firing the energy source by impact.

8. The seismic source apparatus claimed in claim 7, wherein the piston and shaft arrangement impacts the energy source by water pressure.

9. The seismic source apparatus claimed in claim 7, wherein the piston and shaft arrangement impacts the energy source by spring pressure.

10. A system for seismic imaging using in-sea energy sources comprising:
    a seismic energy source apparatus configured for deployment in deep water having a depth of 500 meters or more, and having one or more self-contained energy sources, configured to generate seismic waves by implosion, and a triggering device configured for firing the energy sources;
    a handling system configured for deploying the energy sources in the deep water;
    at least one sensor configured for determining a time of firing with respect to each energy source with an accuracy better than 1 millisecond; and
    receivers in a borehole at predetermined locations configured for acquiring seismic data generated by the energy sources,
    wherein the system is configured to synchronize seismic data acquisition by the receivers in the borehole, source firing, and determination of time of firing by the at least one sensor, and for firing the energy sources under precisely controlled conditions of location and time.

11. The system for seismic imaging claimed in claim 10, wherein the seismic energy source apparatus is located at the seabed.

12. The system for seismic imaging claimed in claim 10, wherein the receivers are located for borehole seismic imaging.

13. The system for seismic imaging claimed in claim 12, wherein the borehole seismic imaging includes a vertical seismic profile survey and the receivers include geophones coupled to a borehole wall.

14. The system for seismic imaging claimed in claim 12, wherein the borehole seismic imaging includes a seismic measurement while drilling survey and the receivers include geophones located inside a drill string.

15. The system for seismic imaging claimed in claim 10, further including
    a sensor that is deployed adjacent with each energy source for detecting time of a first pressure wave after firing of the energy source.

16. The system for seismic imaging claimed in claim 10, further including
    one or more sensors for detecting a position of each seismic energy source by receiving signals from the energy source.

17. The system for seismic imaging claimed in claim 10, wherein each energy source includes an acoustic device for signaling a position of the energy source.

18. A method of seismic imaging using in-sea energy sources comprising:
    deploying a seismic energy source apparatus in deep water having a depth of 500 meters or more, the apparatus having one or more self contained energy sources, configured to generate seismic waves by implosion, and a triggering device for firing the energy sources;
    configuring a handling system for deploying the energy sources in deep water;
    determining a time of firing with respect to each energy source with an accuracy better than 1 millisecond using at least one sensor;
    configuring receivers in a borehole at predetermined locations for acquiring seismic data generated by the energy sources;
    synchronizing the seismic data acquisition by the receivers in the borehole, the source firing, and the determination of time of firing by the at least one sensor; and
    firing the energy sources under precisely controlled conditions of location and time.

* * * * *